(12) United States Patent
Ye et al.

(10) Patent No.: US 12,470,751 B2
(45) Date of Patent: Nov. 11, 2025

(54) SIGNALING OF DOWNSAMPLING FILTERS FOR CHROMA FROM LUMA INTRA PREDICTION MODE

(71) Applicant: TENCENT AMERICA LLC, Palo Alto, CA (US)

(72) Inventors: Jing Ye, San Jose, CA (US); Xin Zhao, San Jose, CA (US); Liang Zhao, Sunnyvale, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 168 days.

(21) Appl. No.: 17/982,979

(22) Filed: Nov. 8, 2022

(65) Prior Publication Data

US 2024/0007676 A1    Jan. 4, 2024

Related U.S. Application Data

(60) Provisional application No. 63/356,820, filed on Jun. 29, 2022.

(51) Int. Cl.
| | | |
|---|---|---|
| *H04N 19/70* | (2014.01) | |
| *H04N 19/117* | (2014.01) | |
| *H04N 19/132* | (2014.01) | |
| *H04N 19/176* | (2014.01) | |

(Continued)

(52) U.S. Cl.
CPC .......... *H04N 19/70* (2014.11); *H04N 19/117* (2014.11); *H04N 19/132* (2014.11); *H04N 19/176* (2014.11); *H04N 19/186* (2014.11); *H04N 19/593* (2014.11)

(58) Field of Classification Search
CPC .... H04N 19/132; H04N 19/11; H04N 19/176; H04N 19/70; H04N 19/186; H04N 19/593; H04N 19/59; H04N 19/117
See application file for complete search history.

(56) References Cited

U.S. PATENT DOCUMENTS 10,455,249 B2 * 10/2019 Zhang .................. H04N 19/176
11,381,820 B2 *  7/2022 Li .......................... H04N 19/70
(Continued)

OTHER PUBLICATIONS

Peter De Rivaz et al., "AV1 Bitstream & Decoding Process Specification", Jan. 8, 2019, 681 pages.
(Continued)

*Primary Examiner* — Tsion B Owens
(74) *Attorney, Agent, or Firm* — Sughrue Mion, PLLC

(57) ABSTRACT

Methods and apparatuses for performing cross-component intra prediction, including: receiving a coded bitstream; obtaining, from the coded bitstream, a syntax element indicating a downsampling filter used for a cross-component intra prediction mode; obtaining a plurality of reconstructed sample values of a first component which are associated with a pixel of a second component based on the downsampling filter; determining a pixel value of a downsampled pixel of the first component, based on the plurality of reconstructed sample values; determining a pixel value of the pixel of the second component based on the pixel value of the downsampled pixel of the first component; and reconstructing a picture based on the pixel value of the pixel of the second component.

20 Claims, 18 Drawing Sheets

(51) Int. Cl.
*H04N 19/186* (2014.01)
*H04N 19/593* (2014.01)

(56) References Cited

U.S. PATENT DOCUMENTS

| | | | | |
|---|---|---|---|---|
| 11,616,987 B2* | 3/2023 | Jeong | ................ | H04N 19/172 |
| | | | | 375/240.29 |
| 11,677,956 B2* | 6/2023 | Zhang | ................ | H04N 19/132 |
| | | | | 375/240.02 |
| 11,736,730 B2* | 8/2023 | Bay | ................ | H04N 9/77 |
| | | | | 375/240.2 |
| 11,758,142 B2* | 9/2023 | Koo | ................ | H04N 19/11 |
| | | | | 375/240.02 |
| 11,930,185 B2* | 3/2024 | Zhang | ................ | H04N 19/11 |
| 11,979,576 B2* | 5/2024 | Park | ................ | H04N 19/96 |
| 12,003,745 B2* | 6/2024 | Xu | ................ | H04N 19/1883 |
| 2012/0287995 A1 | 11/2012 | Budagavi | | |
| 2013/0136174 A1 | 5/2013 | Xu et al. | | |
| 2016/0198190 A1 | 7/2016 | Budagavi | | |
| 2019/0306516 A1* | 10/2019 | Misra | ................ | H04N 19/593 |
| 2021/0067802 A1 | 3/2021 | Jin et al. | | |
| 2022/0124341 A1* | 4/2022 | Zhang | ................ | H04N 19/186 |
| 2022/0191526 A1 | 6/2022 | Aggarwal et al. | | |
| 2022/0295056 A1* | 9/2022 | Lim | ................ | H04N 19/11 |
| 2023/0050376 A1* | 2/2023 | Filippov | ................ | H04N 19/176 |

OTHER PUBLICATIONS

Luc N. Trudeau et al., "Predicting Chroma from Luma in AV1", Data Compression Conference, IEEE, 2018, pp. 374-382.
Yue Chen et al., "An Overview of Core Coding Tools in the AV1 Video Codec", PCS 2018, pp. 41-45.
International Search Report dated Mar. 14, 2023 in Application No. PCT/US2022/049387.
Written Opinion of the International Searching Authority dated Mar. 14, 2023 in Application No. PCT/US2022/049387.
Zhang et al. "Enhanced Cross-Component Linear Model for Chroma Intra-Prediction in Video Coding." IEEE Transactions on Image Processing, vol. 27, No. 8 (Aug. 2018), pp. 3983-3997 (15 total pages).

* cited by examiner

FIG. 12

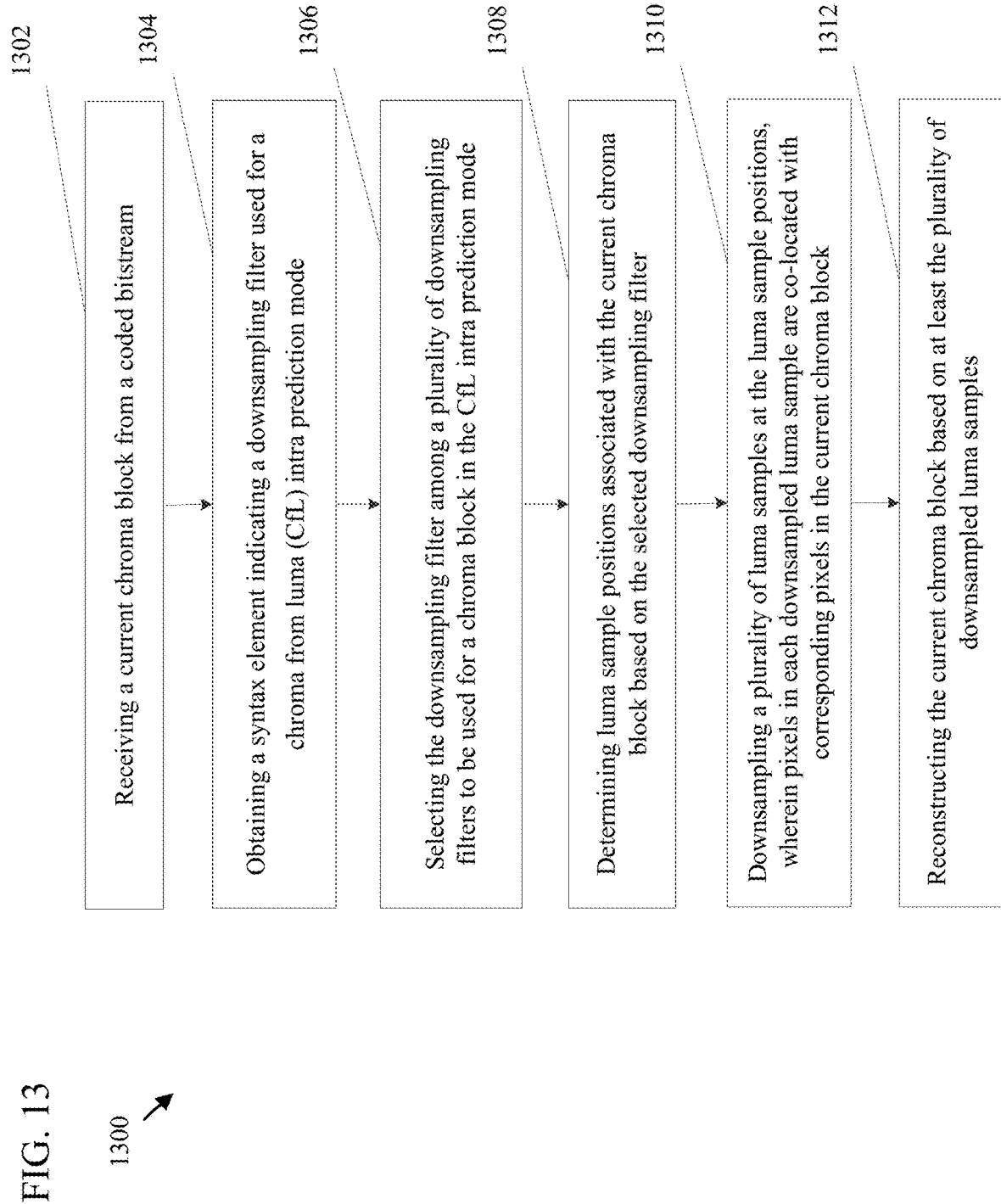

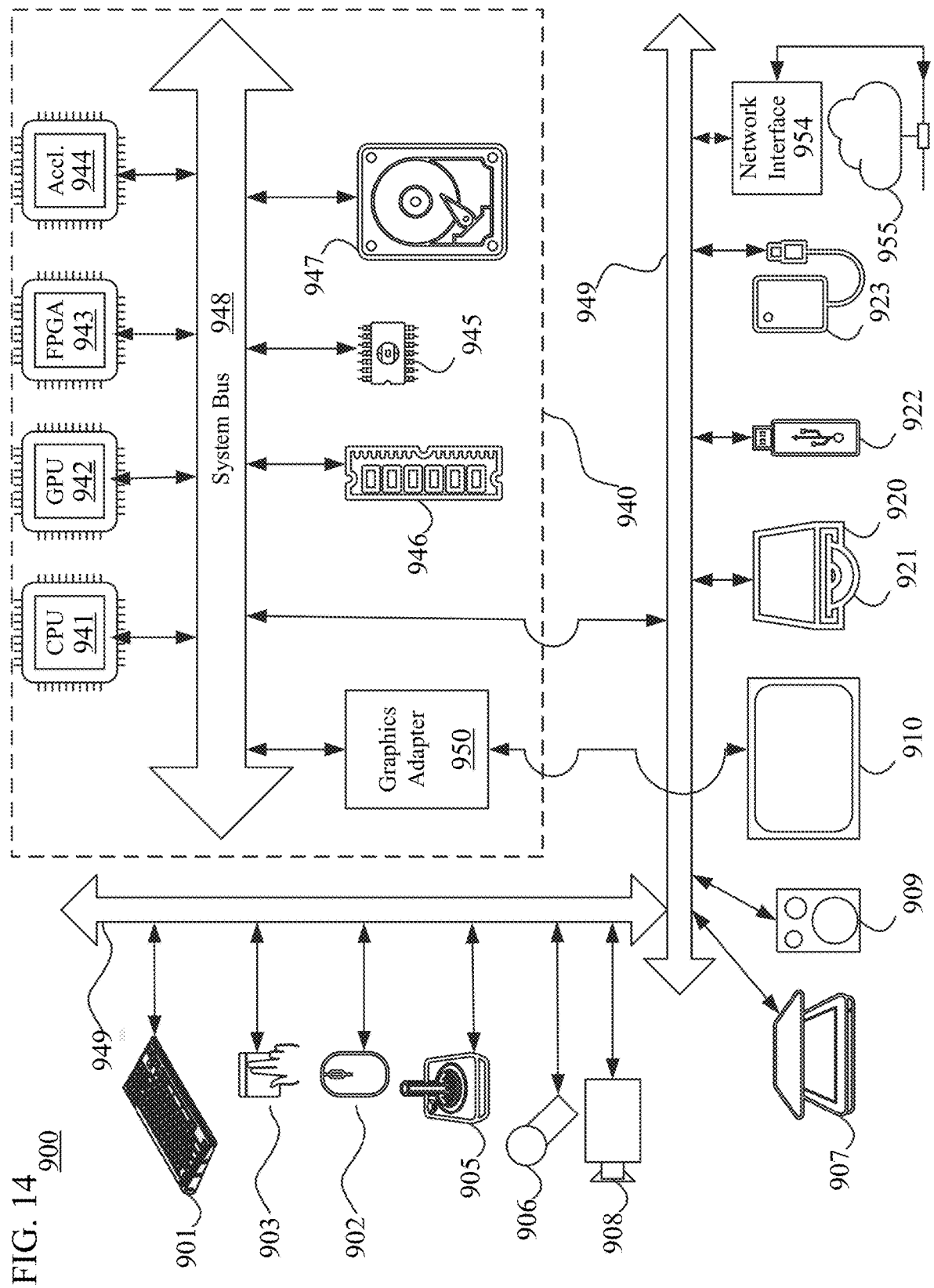

US 12,470,751 B2

SIGNALING OF DOWNSAMPLING FILTERS FOR CHROMA FROM LUMA INTRA PREDICTION MODE

CROSS-REFERENCE TO RELATED APPLICATIONS

This application claims priority from U.S. Provisional Application No. 63/356,820, filed on Jun. 29, 2022, in the United States Patent and Trademark Office, the disclosures of which are incorporated herein by reference in their entirety.

FIELD

Embodiments of the present disclosure relate to a set of advanced video coding technologies and, more specifically, to signaling downsampling filters for cross-component intra prediction modes.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version, version 0.1.0, of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019, "AV1 Bitstream & Decoding Process Specification" was released, which is a validated version 1.0.0 with Errata 1 of the specification. The AV1 bitstream specification includes a reference video codec. The "AV1 Bitstream & Decoding Process Specification" (Version 1.0.0 with Errata 1), The Alliance for Open Media (Jan. 8, 2019), is incorporated herein in its entirety by reference.

The High Efficiency Video Coding (HEVC) standard is developed jointly by the ITU-T Video Coding Experts Group (VCEG) and the ISO/IEC Moving Picture Experts Group (MPEG) standardization organizations. To develop the HEVC standard, these two standardization organizations work together in a partnership known as the Joint Collaborative Team on Video Coding (JCT-VC). The first edition of the HEVC standard was finalized in January 2013, resulting in an aligned text that was published by both ITU-T and ISO/IEC. After that, additional work was organized to extend the standard to support several additional application scenarios, including extended-range uses with enhanced precision and color format support, scalable video coding, and 3-D/stereo/multiview video coding. In ISO/IEC, the HEVC standard became MPEG-H Part 2 (ISO/IEC 23008-2) and in ITU-T it became ITU-T Recommendation H.265. The specification for the HEVC standard, "SERIES H: AUDIOVISUAL AND MULTIMEDIA SYSTEMS, Infrastructure of audiovisual services—Coding of moving video", ITU-T H.265, International Telecommunication Union (April 2015), is, is incorporated herein in its entirety by reference.

ITU-T VCEG (Q6/16) and ISO/IEC MPEG (JTC 1/SC 29/WG 11) published the H.265/HEVC (High Efficiency Video Coding) standard in 2013 (version 1), 2014 (version 2), 2015 (version 3), and 2016 (version 4). Since then, they have been studying the potential need for standardization of future video coding technology which could significantly outperform HEVC in compression capability. In October 2017, they issued the Joint Call for Proposals on Video Compression with Capability beyond HEVC (CfP). By Feb. 15, 2018, 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th Joint Video Exploration Team—Joint Video Expert Team (JVET) meeting. With careful evaluation, JVET formally launched the standardization of next-generation video coding beyond HEVC, i.e., the so-called Versatile Video Coding (VVC). A specification for the VVC standard, "Versatile Video Coding (Draft 7)", JVET-P2001-vE, Joint Video Experts Team (October 2019), is incorporated herein in its entirety by reference. Another specification for the VVC standard, "Versatile Video Coding (Draft 10)", JVET-S2001-vE, Joint Video Experts Team (July 2020), is incorporated herein in its entirety by reference.

SUMMARY

In accordance with an aspect of the disclosure, a method for performing cross-component intra prediction is performed by at least one processor and includes: receiving a current chroma block from a coded bitstream; obtaining, from the coded bitstream, a syntax element indicating a downsampling filter used for a chroma from luma (CfL) intra prediction mode; selecting the downsampling filter among a plurality of downsampling filters to be used for a chroma block in the CfL intra prediction mode; determining luma sample positions associated with the current chroma block based on the selected downsampling filter; downsampling a plurality of luma samples at the luma sample positions, wherein pixels in each downsampled luma sample are co-located with corresponding pixels in the current chroma block; and reconstructing the current chroma block based on at least the plurality of downsampled luma samples.

In accordance with an aspect of the disclosure, a device for performing cross-component intra prediction includes at least one memory configured to store program code; and at least one processor configured to access the program code and operate as instructed by the program code, the program code including: receiving code configured to cause the at least one processor to receive a current chroma block from a coded bitstream; obtaining code configured to cause the at least one processor to obtain, from the coded bitstream, a syntax element indicating a downsampling filter used for a chroma from luma (CfL) intra prediction mode; selecting code configured to cause the at least one processor to select the downsampling filter among a plurality of downsampling filters to be used for a chroma block in the CfL intra prediction mode; determining code configured to cause the at least one processor to determine luma sample positions associated with the current chroma block based on the selected downsampling filter; downsampling code configured to cause the at least one processor to downsample a plurality of luma samples at the luma sample positions, wherein pixels in each downsampled luma sample are co-located with corresponding pixels in the current chroma block; and reconstructing code configured to cause the at least one processor to reconstruct the current chroma block based on at least the plurality of downsampled luma samples.

In accordance with an aspect of the disclosure, a non-transitory computer-readable medium stores instructions, including: one or more instructions that, when executed by one or more processors of a device for performing cross-component intra prediction, cause the one or more processors to: receive a current chroma block from a coded bitstream; obtain, from the coded bitstream, a syntax element indicating a downsampling filter used for a chroma from luma (CfL) intra prediction mode; select the downsampling filter among a plurality of downsampling filters to be used for a chroma block in the CfL intra prediction mode; determine luma sample positions associated with the current chroma block based on the selected downsampling filter; downsample a plurality of luma samples at the luma sample positions, wherein pixels in each downsampled luma sample are co-located with corresponding pixels in the current chroma block; and reconstruct the current chroma block based on at least the plurality of downsampled luma samples.

BRIEF DESCRIPTION OF THE DRAWINGS

Further features, the nature, and various advantages of the disclosed subject matter will be more apparent from the following detailed description and the accompanying drawings in which:

FIG. 12 is a diagram illustrating positions corresponding to filter tap coefficients, according to embodiments.

FIG. 13 is a flowchart of a method or performing cross-component intra prediction, according to embodiments.

FIG. 14 is a diagram of a computer system suitable for implementing embodiments of the present disclosure.

DETAILED DESCRIPTION

In the present disclosure, the term "block" may be interpreted as a prediction block, a coding block, or a coding unit (CU). The term "block" here may also be used to refer to a transform block.

In the present disclosure, the term "transform set" refers to a group of transform kernel (or candidates) options. A transform set may include one or more transform kernel (or candidates) options. According to embodiments of the present disclosure, when more than one transform options are available, an index may be signaled to indicate which one of the transform options in the transform set is applied for the current block.

In the present disclosure, the term "prediction mode set" refers to a group of prediction mode options. A prediction mode set may include one or more prediction mode options. According to embodiments of the present disclosure, when more than one prediction mode options are available, an index may be further signaled to indicate which one of the prediction mode options in the prediction mode set is applied for the current block for performing the prediction.

In the present disclosure, the term "neighboring reconstructed samples set" refers to a group of reconstructed samples from previously decoded neighboring blocks or reconstructed samples in a previously decoded picture.

In the present disclosure, the term "neural network" refers to a general concept of data processing structure with one or multiple layers, as described herein with reference to "deep learning for video coding." According to embodiments of the present disclosure, any neural network may be configured to implement the embodiments.

Figure 1:
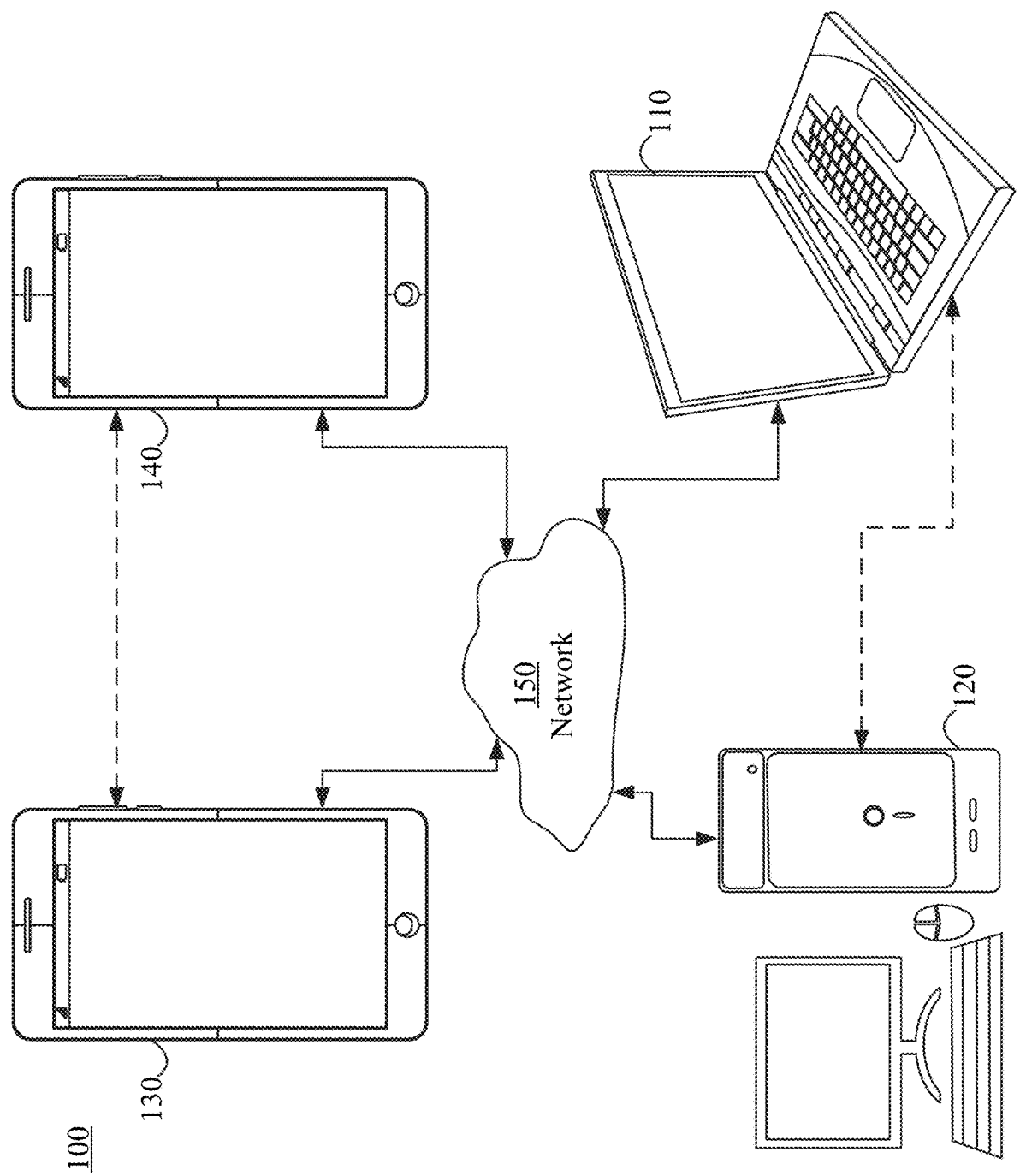
FIG. 1 is a schematic illustration of a simplified block diagram of a communication system, according to embodiments.

FIG. 1 illustrates a simplified block diagram of a communication system (100) according to an embodiment of the present disclosure. The system (100) may include at least two terminals (110, 120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data, and may display the recovered video data at a local display device.

In FIG. 1, the terminals (110-140) may be illustrated as servers, personal computers, and smart phones, and/or any other type of terminal. For example, the terminals (110-140) may be laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels.

Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
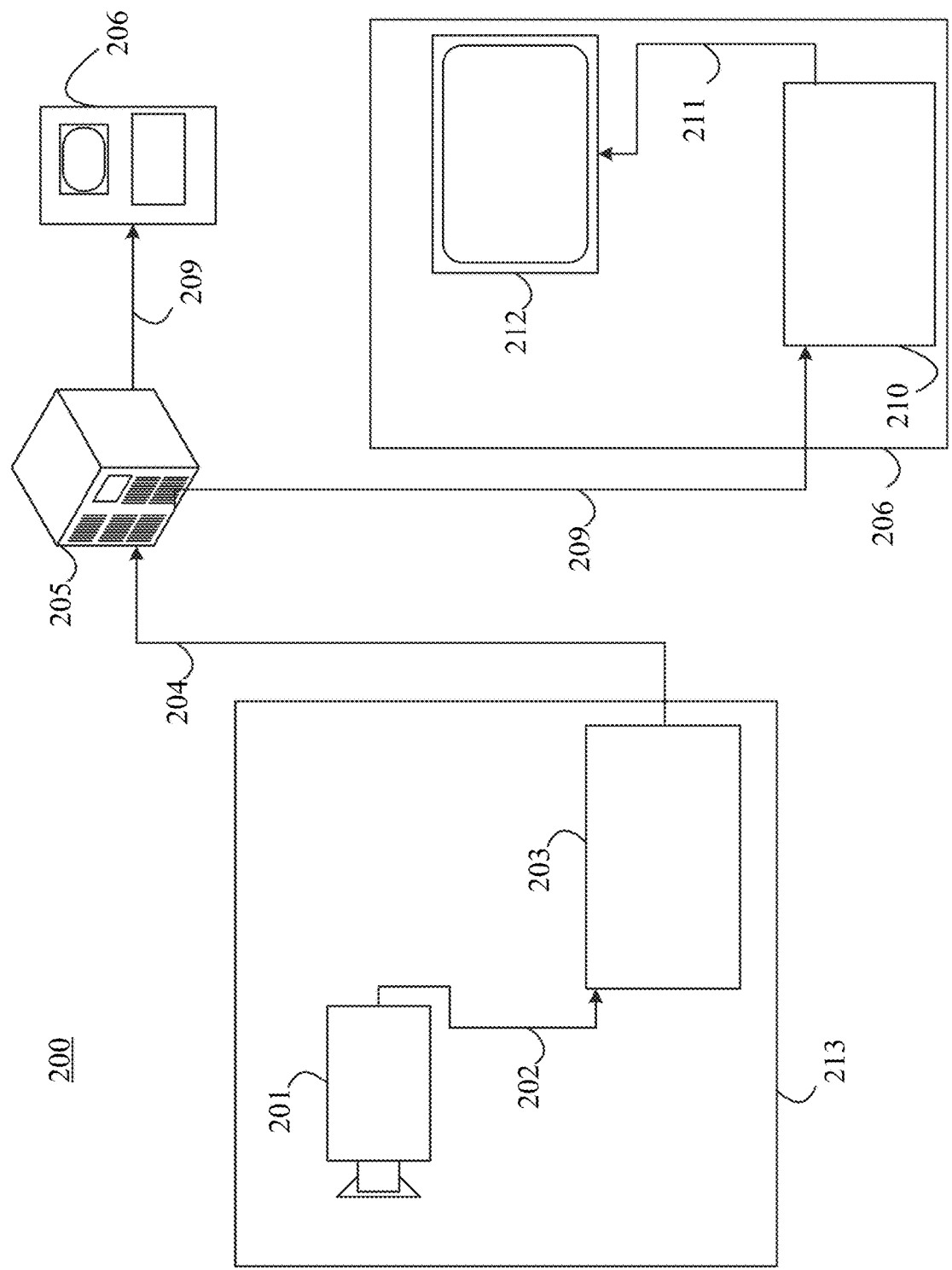
FIG. 2 is a schematic illustration of a simplified block diagram of a communication system, according to embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

As illustrated in FIG. 2, a streaming system (200) may include a capture subsystem (213) that can include a video source (201) and an encoder (203). The video source (201) may be, for example, a digital camera, and may be configured to create an uncompressed video sample stream (202). The uncompressed video sample stream (202) may provide a high data volume when compared to encoded video bitstreams, and can be processed by the encoder (203) coupled to the video source (201), which may be for example a camera. The encoder (203) can include hardware, software, or a combination thereof to enable or implement aspects of the disclosed subject matter as described in more detail below. The encoded video bitstream (204) may include a lower data volume when compared to the sample stream, and can be stored on a streaming server (205) for future use. One or more streaming clients (206) can access the streaming server (205) to retrieve video bit streams (209) that may be copies of the encoded video bitstream (204).

In embodiments, the streaming server (205) may also function as a Media-Aware Network Element (MANE). For example, the streaming server (205) may be configured to prune the encoded video bitstream (204) for tailoring potentially different bitstreams to one or more of the streaming clients (206). In embodiments, a MANE may be separately provided from the streaming server (205) in the streaming system (200).

The streaming clients (206) can include a video decoder (210) and a display (212). The video decoder (210) can, for example, decode video bitstream (209), which is an incoming copy of the encoded video bitstream (204), and create an outgoing video sample stream (211) that can be rendered on the display (212) or another rendering device (not depicted). In some streaming systems, the video bitstreams (204, 209) can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
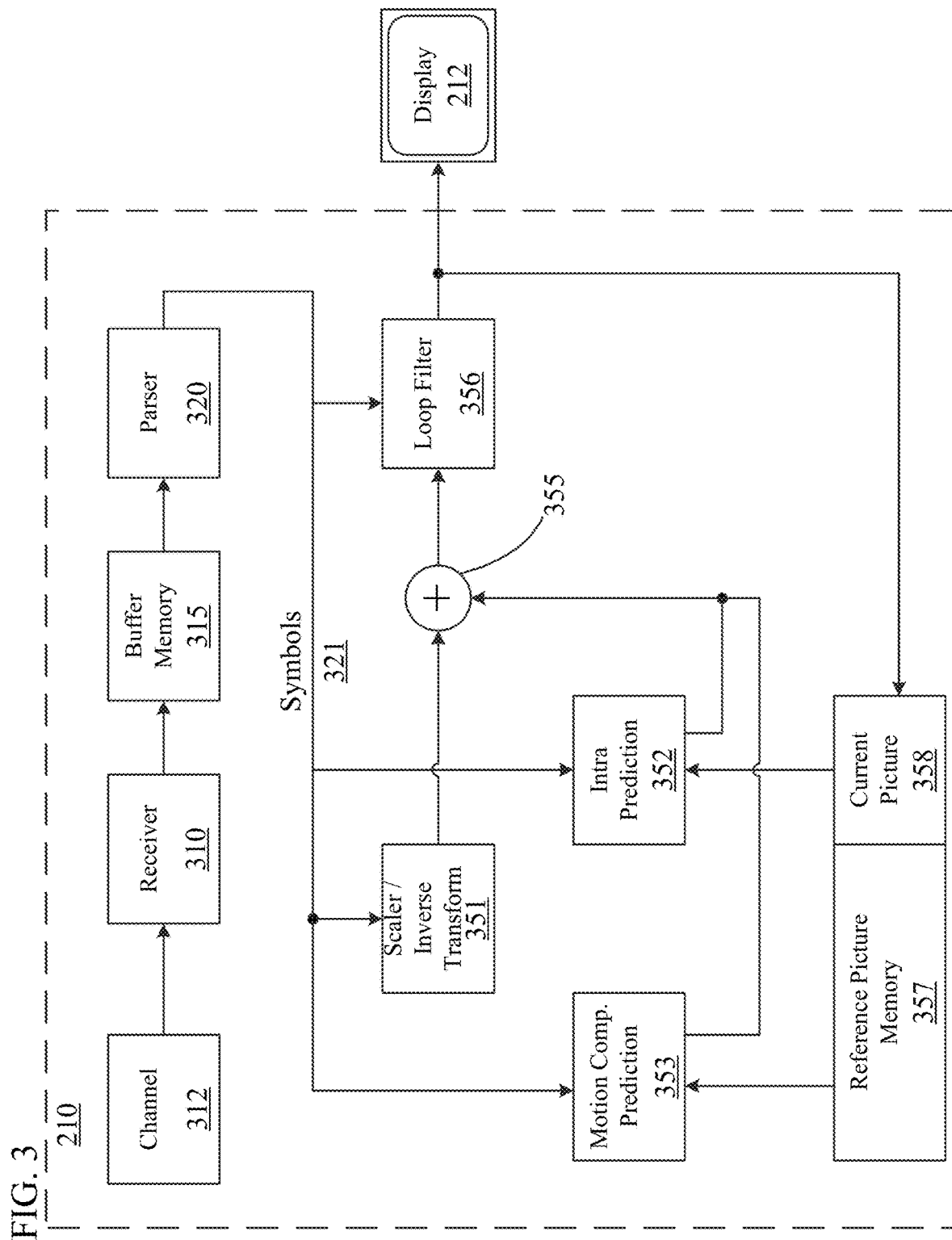
FIG. 3 is a schematic illustration of a simplified block diagram of a decoder, according to embodiments.

FIG. 3 illustrates an example functional block diagram of a video decoder (210) that is attached to a display (212) according to an embodiment of the present disclosure.

The video decoder (210) may include a channel (312), receiver (310), a buffer memory (315), an entropy decoder/parser (320), a scaler/inverse transform unit (351), an intra prediction unit (352), a Motion Compensation Prediction unit (353), an aggregator (355), a loop filter unit (356), reference picture memory (357), and current picture memory ( ). In at least one embodiment, the video decoder (210) may include an integrated circuit, a series of integrated circuits, and/or other electronic circuitry. The video decoder (210) may also be partially or entirely embodied in software running on one or more CPUs with associated memories.

In this embodiment, and other embodiments, the receiver (310) may receive one or more coded video sequences to be decoded by the decoder (210) one coded video sequence at a time, where the decoding of each coded video sequence is independent from other coded video sequences. The coded video sequence may be received from the channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, the buffer memory (315) may be coupled in between the receiver (310) and the entropy decoder/parser (320) ("parser" henceforth). When the receiver (310) is receiving data from a store/forward device of sufficient bandwidth and controllability, or from an isosynchronous network, the buffer memory (315) may not be used, or can be small. For use on best effort packet networks such as the Internet, the buffer memory (315) may be required, can be comparatively large, and can be of adaptive size.

The video decoder (210) may include a parser (320) to reconstruct symbols (321) from the entropy coded video sequence. Categories of those symbols include, for example, information used to manage operation of the decoder (210), and potentially information to control a rendering device such as a display (212) that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients, quantizer parameter values, motion vectors, and so forth.

The parser (320) may perform entropy decoding/parsing operation on the video sequence received from the buffer memory (315), so to create symbols (321).

Reconstruction of the symbols (321) can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser (320). The flow of such subgroup control information between the parser (320) and the multiple units below is not depicted for clarity.

Beyond the functional blocks already mentioned, decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit (351). The scaler/inverse transform unit (351) may receive quantized transform coefficient as well as control information, including which transform to use, block size, quantization factor, quantization scaling matrices, etc. as symbol(s) (321) from the parser (320). The scaler/inverse transform unit (351) can output blocks including sample values that can be input into the aggregator (355).

In some cases, the output samples of the scaler/inverse transform unit (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture from the current picture memory (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (351) (in this case called the residual samples or residual signal) so to generate output sample information. The addresses within the reference picture memory (357), from which the Motion Compensation Prediction unit (353) fetches prediction samples, can be controlled by motion vectors. The motion vectors may be available to the Motion Compensation Prediction unit (353) in the form of symbols (321) that can have, for example, X, Y, and reference picture components. Motion compensation also can include interpolation of sample values as fetched from the reference picture memory (357) when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to a render device such as a display (212), as well as stored in the reference picture memory (357) for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture can become part of the reference picture memory (357), and a fresh current picture memory can be reallocated before commencing the reconstruction of the following coded picture.

The video decoder (210) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
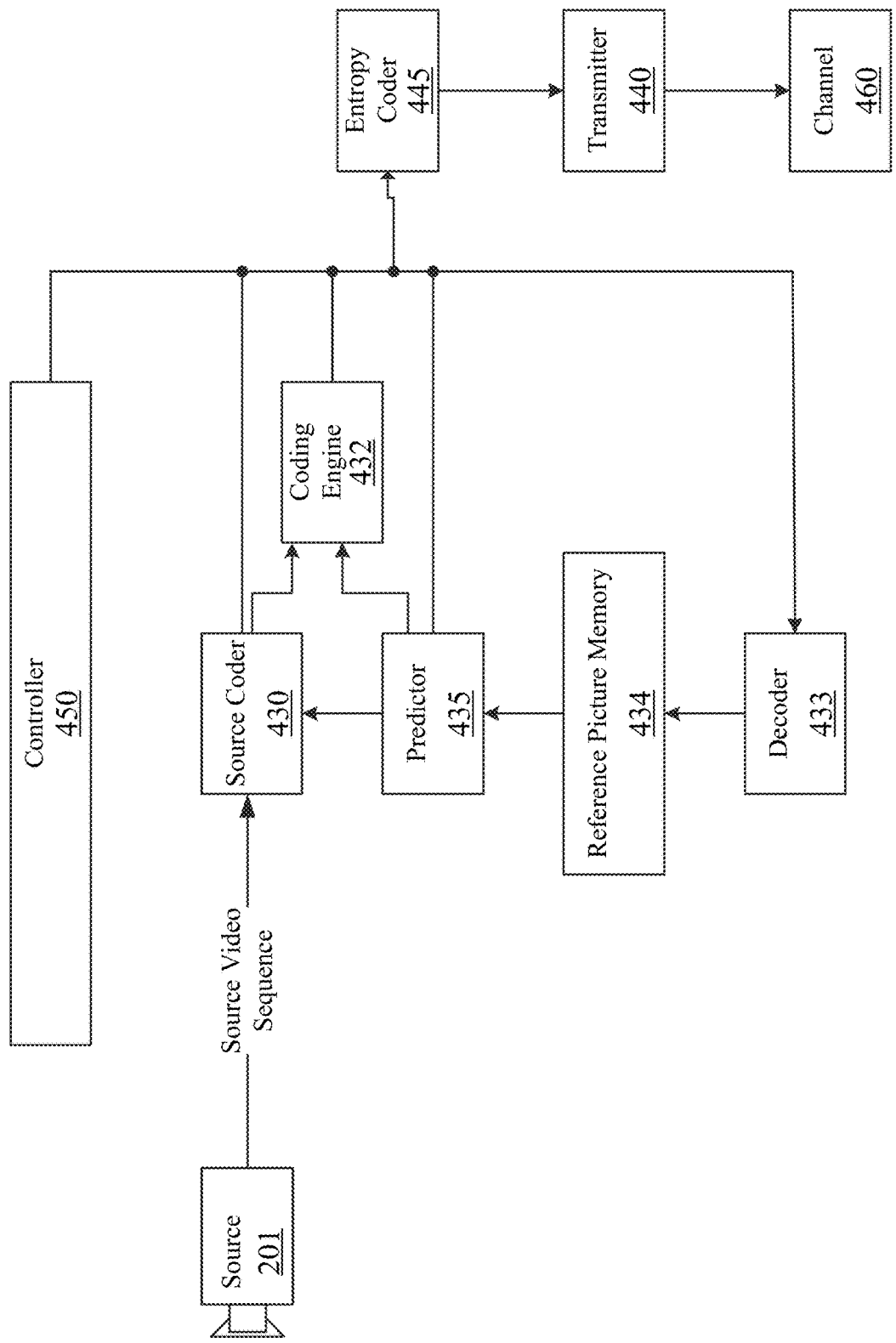
FIG. 4 is a schematic illustration of a simplified block diagram of an encoder, according to embodiments.

FIG. 4 illustrates an example functional block diagram of a video encoder (203) associated with a video source (201) according to an embodiment of the present disclosure.

The video encoder (203) may include, for example, an encoder that is a source coder (430), a coding engine (432), a (local) decoder (433), a reference picture memory (434), a predictor (435), a transmitter (440), an entropy coder (445), a controller (450), and a channel (460).

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, ... ), any colorspace (for example, BT.601 Y CrCB, RGB, ... ) and any suitable sampling structure (for example Y CrCb 4:2:0, Y CrCb 4:4:4). In a media serving system, the video source (201) may be a storage device storing previously prepared video. In a videoconferencing system, the video source (201) may be a camera that captures local image information as a video sequence. Video data may be provided as a plurality of individual pictures that impart motion when viewed in sequence. The pictures themselves may be organized as a spatial array of pixels, wherein each pixel can include one or more sample depending on the sampling structure, color space, etc. in use. A person skilled in the art can readily understand the relationship between pixels and samples. The description below focuses on samples.

According to an embodiment, the encoder (203) may code and compress the pictures of the source video sequence into a coded video sequence (443) in real time or under any other time constraints as required by the application. Enforcing appropriate coding speed is one function of controller (450). The controller (450) may also control other functional units as described below and may be functionally coupled to these units. The coupling is not depicted for clarity. Parameters set by the controller (450) can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an over-simplified description, a coding loop can consist of the encoding part of the source coder (430) (responsible for creating symbols based on an input picture to be coded, and a reference picture(s)), and the (local) decoder (433) embedded in the encoder (203) that reconstructs the symbols to create the sample data that a (remote) decoder also would create when a compression between symbols and coded video bitstream is lossless in certain video compression technologies. That reconstructed sample stream may be input to the reference picture memory (434). As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder (433) can be the same as of a "remote" decoder (210), which has already been described in detail above in conjunction with FIG. 3. However, as symbols are available and en/decoding of symbols to a coded video sequence by the entropy coder (445) and the parser (320) can be lossless, the entropy decoding parts of decoder (210), including channel (312), receiver (310), buffer memory (315), and parser (320) may not be fully implemented in the local decoder (433).

An observation that can be made at this point is that any decoder technology, except the parsing/entropy decoding that is present in a decoder, may need to be present, in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture memory (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

[Directional Intra Prediction in AV1]

Figure 5:
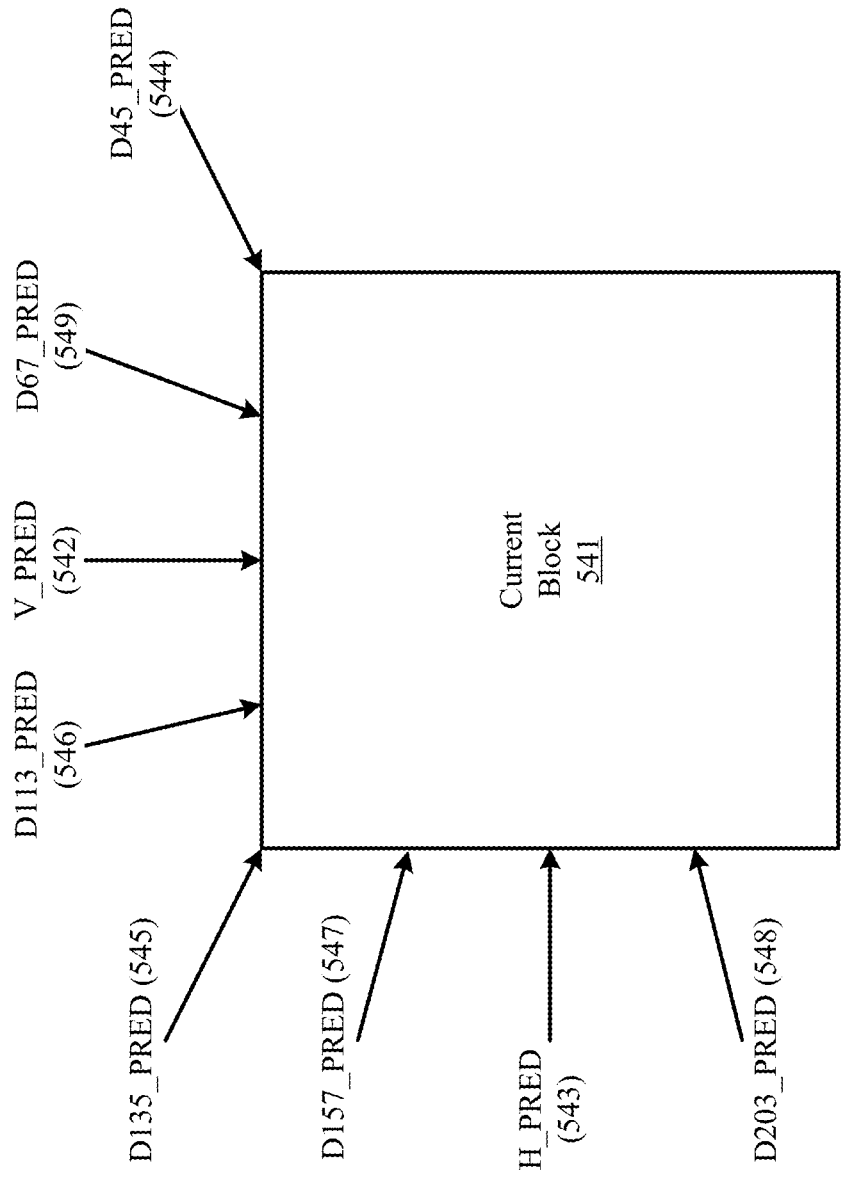
FIG. 5 is a diagram illustrating eight nominal angles in AV1, according to embodiments.

VP9 supports eight directional modes corresponding to angles from 45 to 207 degrees. To exploit more varieties of spatial redundancy in directional textures, in AV1, directional intra modes are extended to an angle set with finer granularity. The original eight angles are slightly changed and made as nominal angles, and these 8 nominal angles are named as V_PRED (542), H_PRED (543), D45_PRED (544), D135_PRED (545), D113_PRED (5446), D157_PRED (547), D203_PRED (548), and D67_PRED (549), which is illustrated in FIG. 5 with respect to a current block (541). For each nominal angle, there are seven finer angles, so AV1 has 56 directional angles in total. The prediction angle is presented by a nominal intra angle plus an angle delta, which is −3~3 multiples of the step size of 3 degrees. In AV1, eight nominal modes together with five non-angular smooth modes are firstly signaled. Then, if current mode is an angular mode, an index is further signaled to indicate the angle delta to the corresponding nominal angle. To implement directional prediction modes in AV1 via a generic way, all the 56 directional intra prediction mode in AV1 are implemented with a unified directional predictor that projects each pixel to a reference sub-pixel location and interpolates the reference pixel by a 2-tap bilinear filter.

[Non-Directional Smooth Intra Predictors in AV1]

Figure 6:
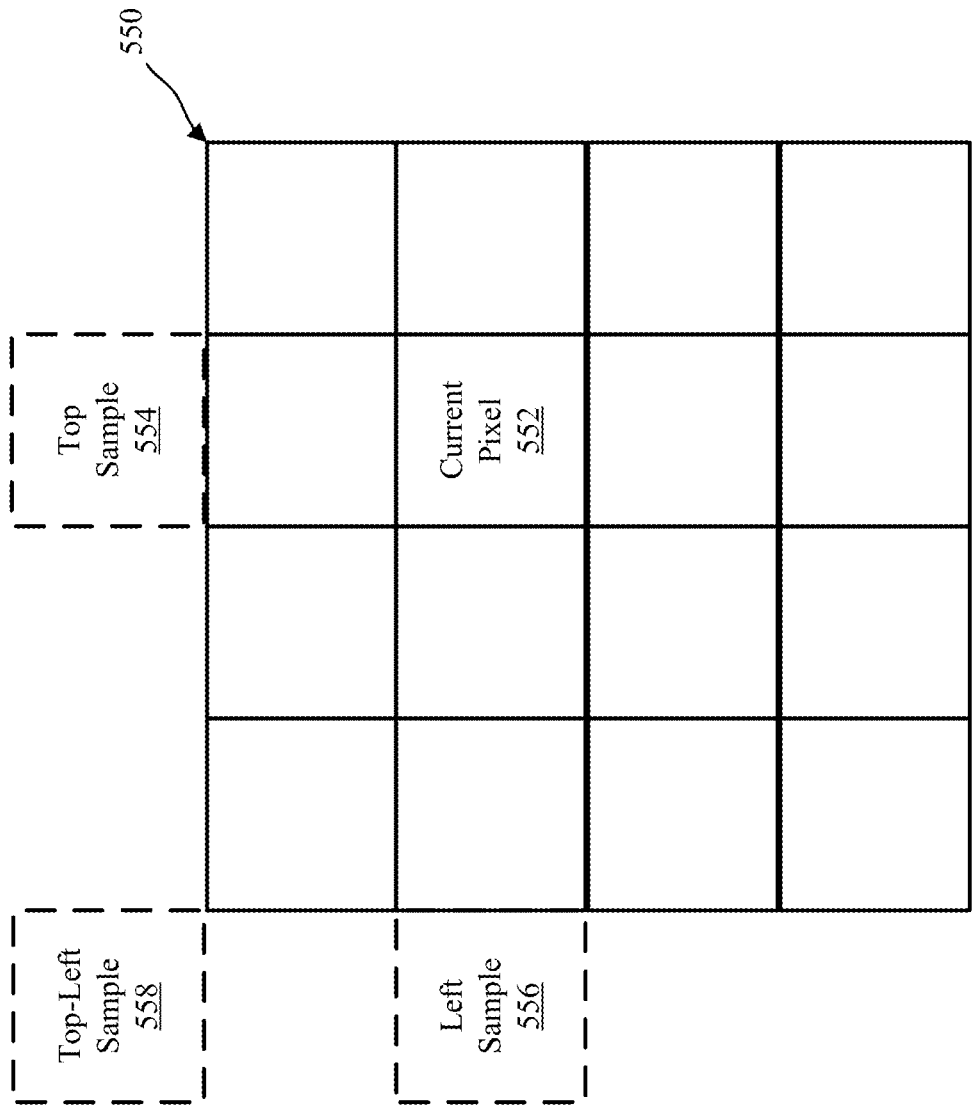
FIG. 6 is a diagram illustrating a current block and samples, according to embodiments.

In AV1, there are five non-directional smooth intra prediction modes, which are DC, PAETH, SMOOTH, SMOOTH_V, and SMOOTH_H. For DC prediction, the average of left and above neighboring samples is used as the predictor of the block to be predicted. For PAETH predictor, top, left, and top-left reference samples are firstly fetched, and then the value which is closest to (top+left−topleft) is set as the predictor for the pixel to be predicted. FIG. 6 illustrates the positions of a top sample (554), a left sample (556), and a top-left sample (558) for a pixel (552) in a current block (550). For SMOOTH, SMOOTH_V, and SMOOTH_H modes, the current block (550) is predicted using quadratic interpolation in vertical or horizontal directions, or the average of both directions.

[Chroma Predicted from Luma]

In addition to the above modes, Chroma from Luma (CfL) is a chroma-only intra predictor that models chroma pixels as a linear function of coincident reconstructed luma pixels. The CfL prediction may be expressed as shown below in Equation (1):

$$CfL(\alpha) = \alpha \times L^{AC} + DC \quad \text{(Eq. 1)}$$

In Equation (1), $L^{AC}$ denotes the AC contribution of luma component, $\alpha$ denotes the parameter of the linear model, and DC denotes the DC contribution of the chroma component.

Figure 7:
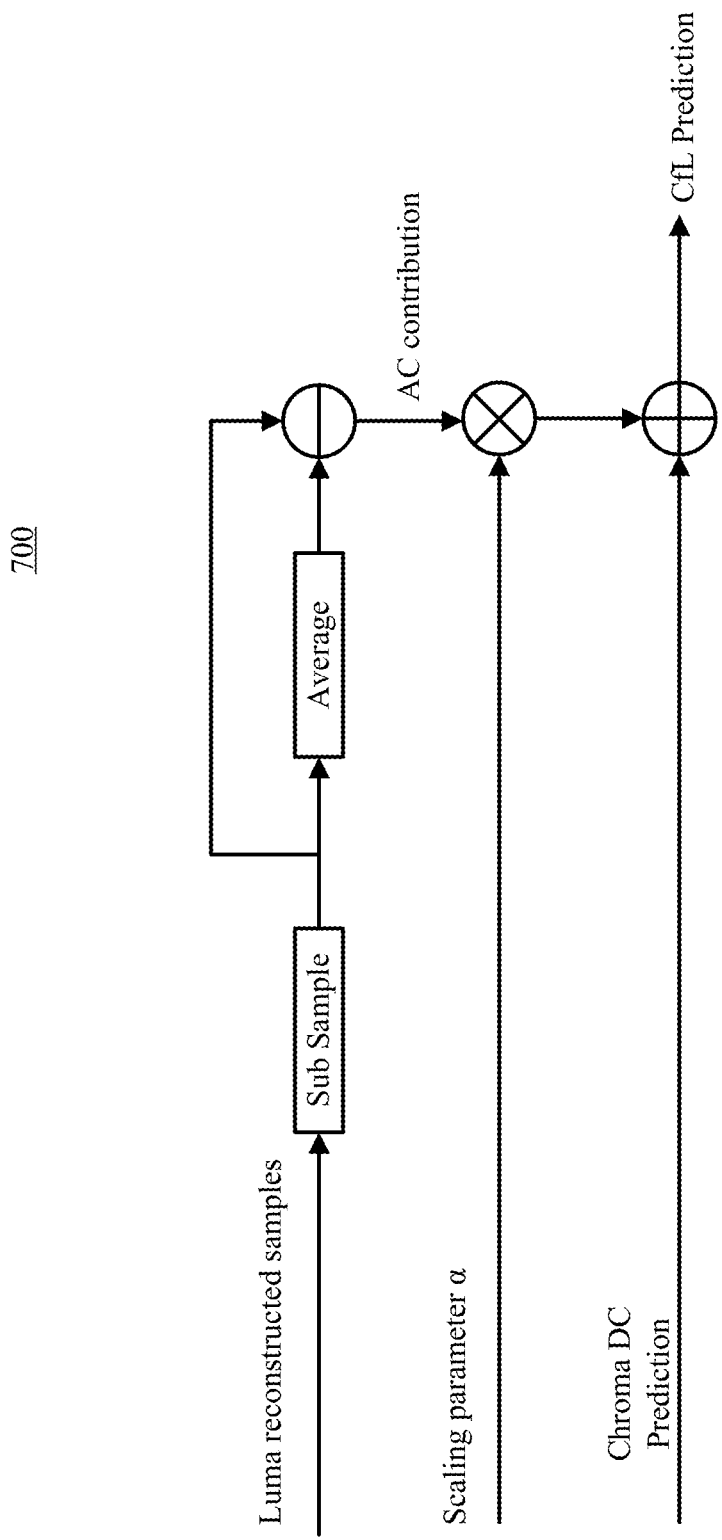
FIG. 7 is a graphical illustration of a linear function corresponding to a chroma for luma mode, according to embodiments.

FIG. 7 provides a graphical illustration of the linear function described by Equation (1). As can be seen in FIG. 7 and Equation (1), the reconstructed luma pixels are sub-sampled into the chroma resolution, and then the average value is subtracted to form the AC contribution. To approximate chroma AC component from the AC contribution, instead of requiring the decoder to calculate the scaling parameters as in some background art, AV1 CfL may determine the parameter a based on the original chroma pixels and signal them in the bitstream. This reduces decoder complexity and yields more precise predictions. As for the DC contribution of the chroma component, it may be computed using intra DC mode, which is sufficient for most chroma content and has mature fast implementations.

Figure 8:
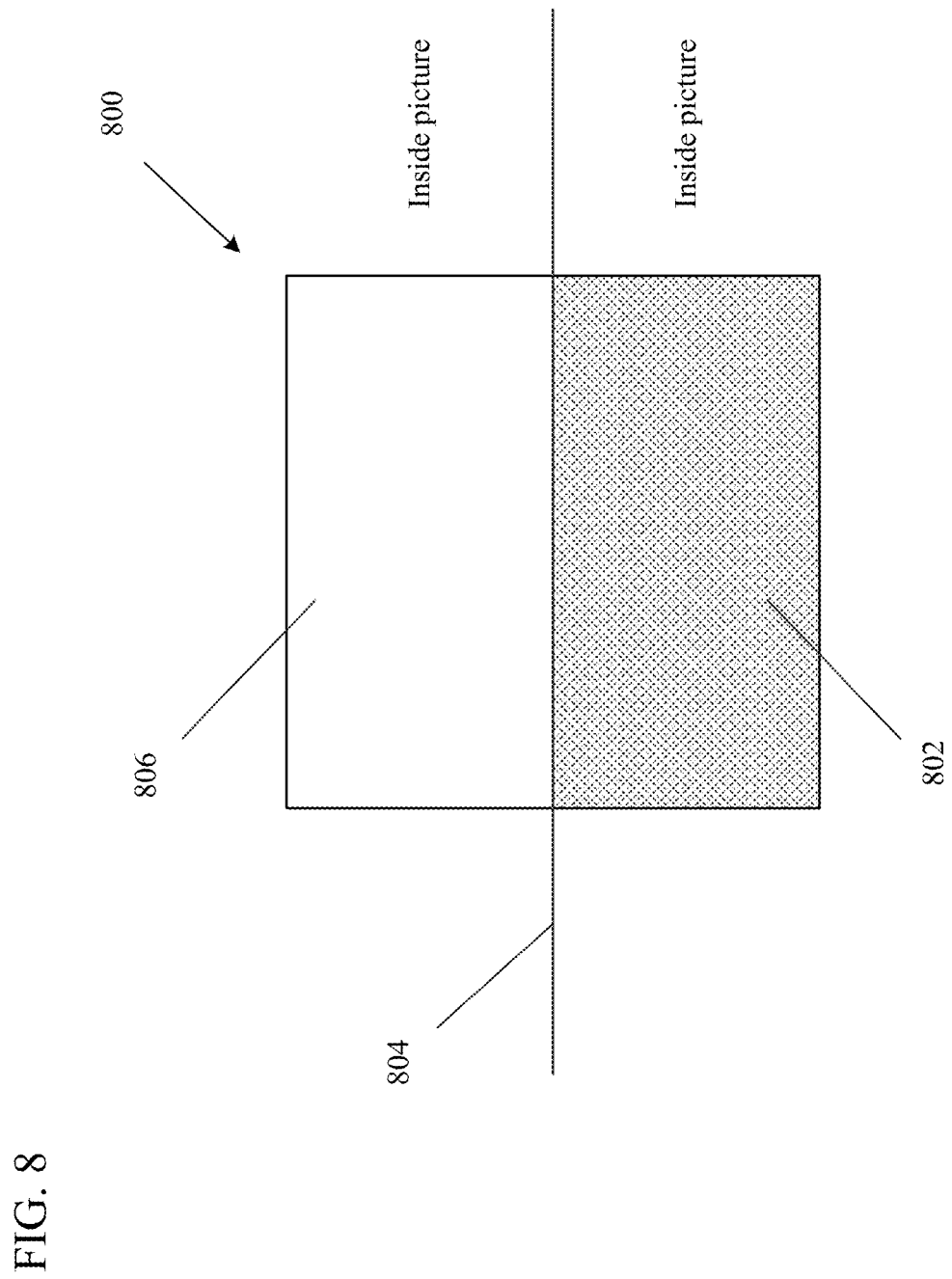
FIG. 8 is a diagram illustrating luma samples inside and outside of a picture boundary, according to embodiments.

In CfL mode, when some samples in the co-located luma blocks are out of picture boundary, these samples may be padded and used to calculate the average of luma samples. As shown in FIG. 8, the samples in area 802 of current block 800 are outside of the picture, as shown by picture boundary 804, and these samples may be padded by copying the values of nearest available samples within the current block 800, for example the samples included in area 806 of current block 800.

In CfL mode, the luma subsampling step is combined with the average subtraction step, as shown in FIG. 7. In this way, not only the equations are simplified, but the subsampling divisions and the corresponding rounding error are removed. An example of an equation corresponding to the combination of both steps is given in Equation (2), which may be simplified to form Equation (3).

$$L_{u,v}^{AC} = 8\left(\frac{S(s_x, s_y, u, v)}{s_y \times s_x}\right) - \frac{8 \sum_i \sum_j \left(\frac{S(s_x, s_y, i, j)}{s_y \times s_x}\right)}{M \times N} \quad \text{(Eq. 2)}$$

$$\Rightarrow \frac{1}{s_y \times s_x}\left(8 \times S(s_x, s_y, u, v) - \frac{\sum_i \sum_j 8 \times S(s_x, s_y, i, j)}{M \times N}\right) \quad \text{(Eq. 3)}$$

Note that both equations use integer divisions. M×N represents a matrix of pixels in luma plane.

Based on the supported chroma subsampling, it can be shown that Sx×Sy∈{1, 2, 4} and that since both M and N are powers of two, M×N is also a power of two.

For example, in the context of a 4:2:0 chroma subsampling, instead of applying a box filter, the proposed approach only requires to sum the 4 reconstructed luma pixels that coincide with the chroma pixels. That is, a four-tap {¼, ¼, ¼, ¼} filter is used to downsample the co-located luma samples to align the chroma resolution. Afterwards, when CfL will scale its luma pixels to improve the precision of the prediction, whereas some embodiments discussed herein approach may only scale by 2.

[Chroma Downsampling Formats]

Figure 9:
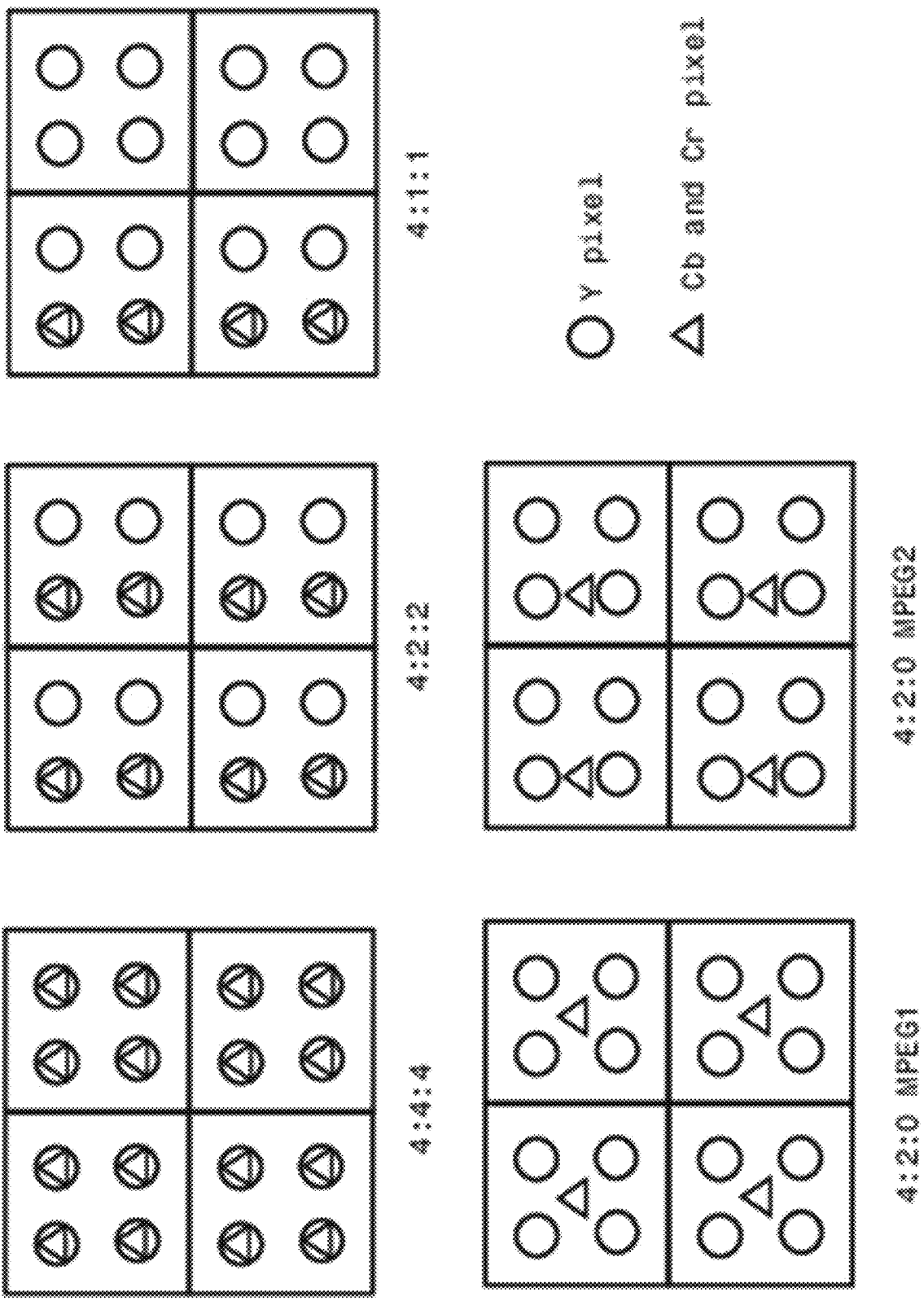
FIG. 9 is a diagram illustrating different YUV formats depending on different chroma downsampling phases, according to embodiments.

In embodiments, there may be different YUV formats depending on different chroma downsampling phases, or namely chroma format, examples of which are shown in FIG. 9. Different chroma formats define different downsampling grids or phases of different color components. For 4:2:0 format, there may be two different downsampling formats, which may be referred to as 4:2:0 MPEG1 or 4:2:0 MPEG2, as shown in FIG. 9.

[Downsampling Filters]

For a luma downsampling filter in AV1, the following Equation (4) is applied to derive a reconstructed luma sample:

$$rec_L'^{(i,j)} = \begin{bmatrix} rec_L(2i-1, 2j-1) + rec_L(2i, 2j-1) + \\ rec_L(2i-1, 2j) + rec_L(2i, 2j) + 2 \end{bmatrix} \gg 2 \quad \text{(Eq. 4)}$$

In Equation (4) above, and in the equations below, $rec'_L$ indicates a pixel value of a downsampled reconstructed luma pixel at location (i,j), which may be the location of the corresponding chroma pixel. In addition, $rec_L(x,y)$ indicates a reconstructed luma sample value located at a position (x,y).

Figure 10:
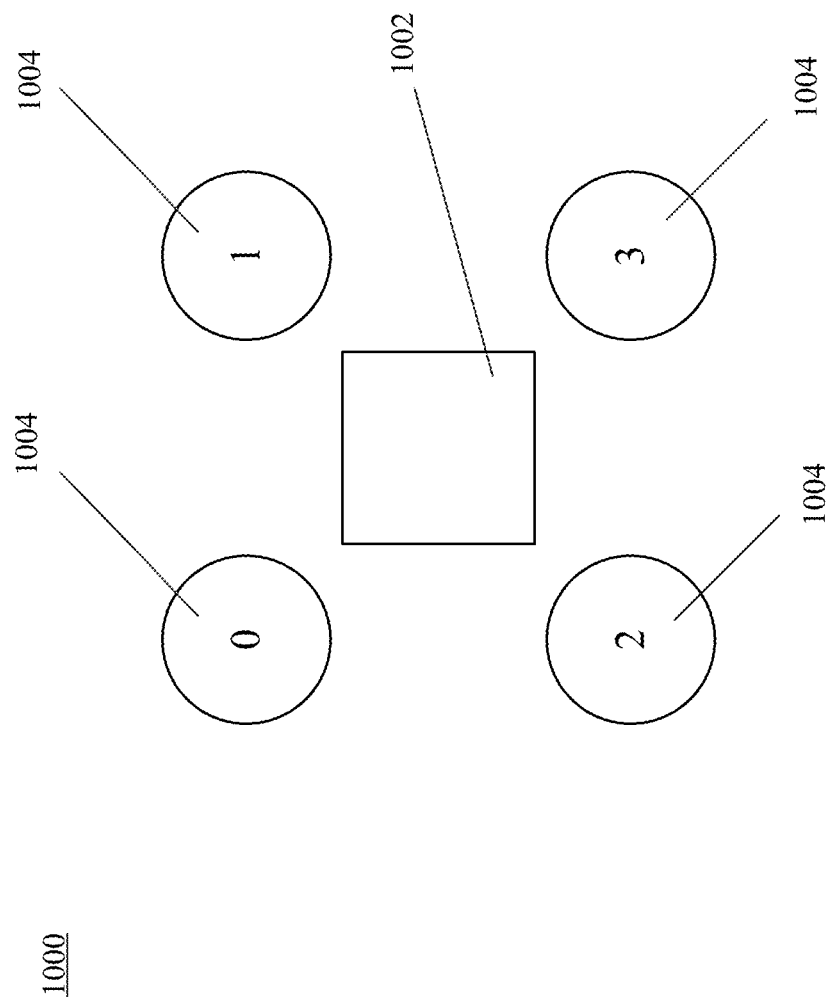
FIG. 10 is a diagram illustrating a downsampling format, according to embodiments.

The downsampling filter in AV1 assumes the chroma downsampling format 1000 shown in FIG. 10, which may correspond to the 4:2:0 MPEG1 downsampling format of FIG. 9. In particular, FIG. 10 shows a chroma sample 1002, and four corresponding luma samples 1004, which are indexed from 0 to 3. In embodiments, the chroma sample may be a chroma pixel, and the luma samples may be luma pixels. In embodiments, the luma samples may be used to determine a value of a downsampled luma sample corresponding to the chroma sample, or a a value of a downsampled luma pixel corresponding to the chroma pixel, according to Equation (4) above.

In some implementations of CfL mode, only one downsample filter is supported, but for some contents or different chroma downsampling formats, the current unique downsampling filter may not be the optimal filter.

Therefore, embodiments may provide support for multiple downsampling filters for luma reconstructed samples when cross-component prediction mode is selected, such as a CfL prediction mode.

Embodiments may also be applied to modes other than the CfL prediction mode, may for example another prediction mode that uses one color component to predict another color component in which downsampling is required for one or more color components. Therefore, embodiments may also be applied by, for example, replacing luma with one specific color component (e.g., R) and chroma with another specific color component (e.g., G or B).

Examples of downsampling filters are provided below, according to embodiments.

Example 1

Figure 11A:
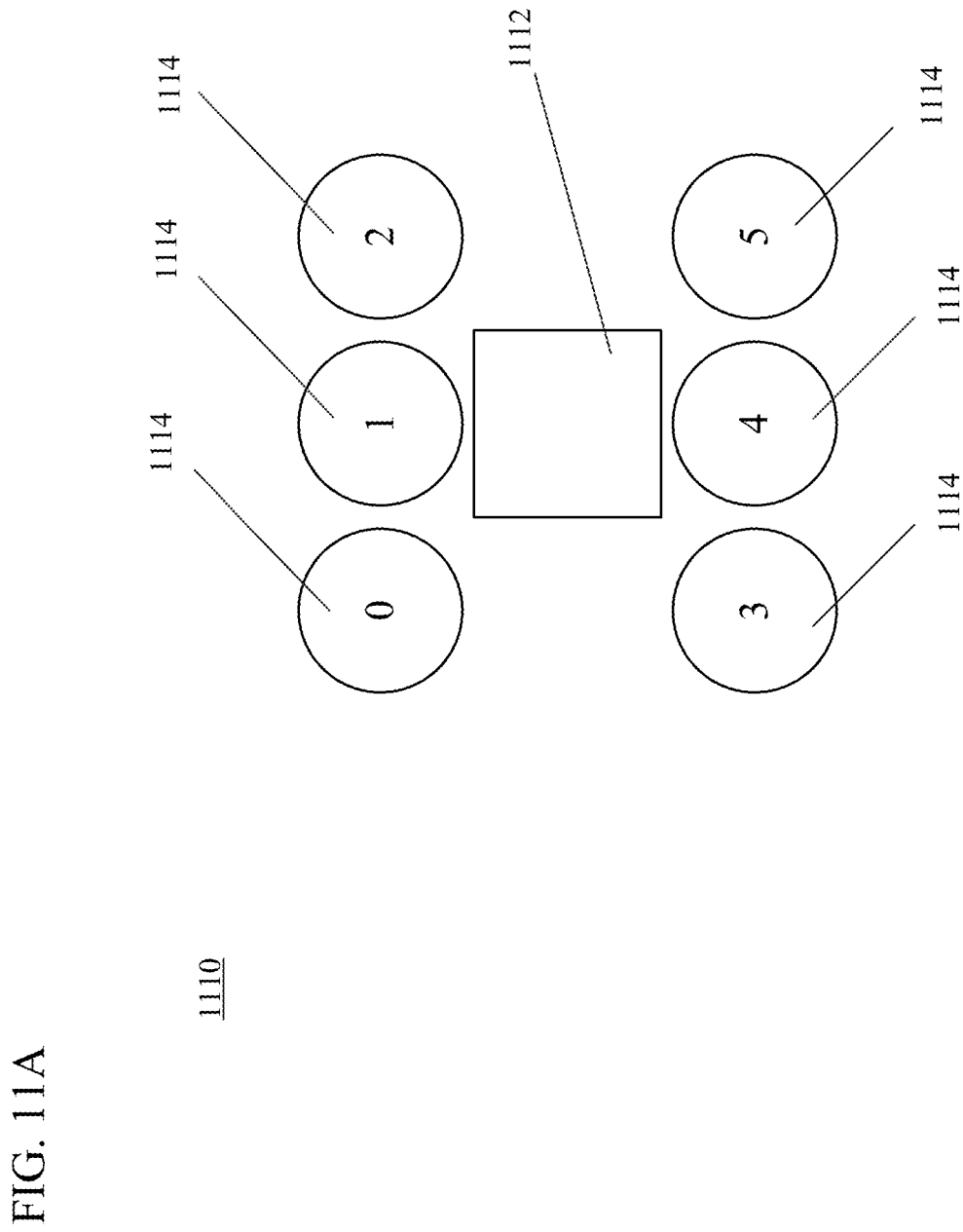
FIGS. 11A-11E are diagrams illustrating downsampling formats, according to embodiments.

According to Example 1, a 6-tap filter may be supported for a cross-component downsampling process, for example a CfL luma downsampling process. FIG. 11A shows a chroma downsampling format 1110 corresponding to the 6-tap filter, according to embodiments. As can be seen in FIG. 11A, the chroma downsampling format 1110 includes a chroma sample 1112, and six corresponding luma samples 1114, which are indexed from 0 to 5. In embodiments, the luma samples 1114 may be reconstructed luma samples, which may be used to derive a downsampled luma pixel corresponding to the chroma sample 1112, which may be located at location (i,j), based on Equation (5) below.

$$rec_L'^{(i,j)} = \begin{bmatrix} rec_L(2i-1, 2j-1) + 2 \cdot rec_L(2i, 2j-1) + rec_L(2i+1, 2j-1) + \\ rec_L(2i-1, 2j) + 2 \cdot rec_L(2i, 2j) + rec_L(2i+1, 2j) + \text{rounding} \end{bmatrix} \gg 3 \quad \text{(Eq. 5)}$$

In Equation (5) above, and in other equations discussed herein, "rounding" may represent a rounding value. In Equation (5), the rounding value may be for example 0, or 4. In embodiments, the 6-tap downsampling filter may assume that the chroma downsampling format corresponds to the 4:2:0 MPEG2 downsampling format.

Example 2

Figure 11B:
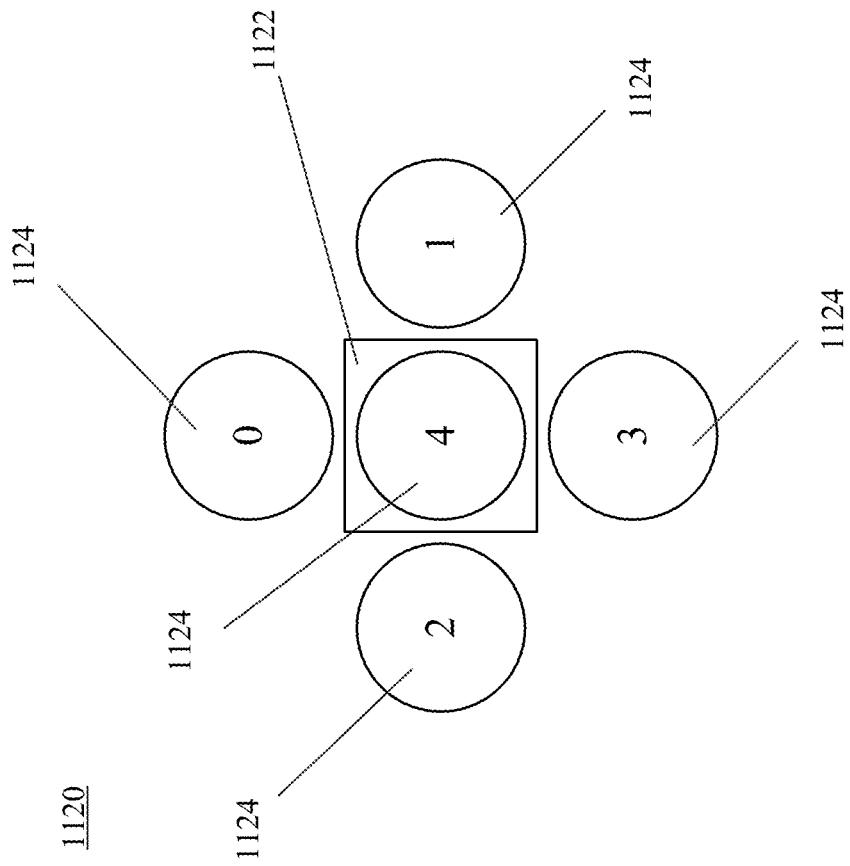

According to Example 2, a 5-tap filter may be supported for a cross-component downsampling process, for example a CfL luma downsampling process. FIG. 11B shows a chroma downsampling format 1120 corresponding to the 5-tap filter, according to embodiments. As can be seen in FIG. 11B, the chroma downsampling format 1110 includes a chroma sample 1122, and five corresponding luma samples 1124, which are indexed from 0 to 4. In embodiments, the luma sample 1124 corresponding with index 4 may be collocated with the chroma sample 1122. In embodiments, the luma samples 1124 may be reconstructed luma samples, which may be used to derive a downsampled luma pixel corresponding to the chroma sample 1122, which may be located at location (i,j), based on one of Equation (6) and Equation (7) below.

$$rec_L'^{(i,j)} = \begin{bmatrix} rec_L(2i, 2j-1) + rec_L(2i-1, 2j) + 4 \cdot rec_L(2i, 2j) + \\ rec_L(2i+1, 2j) + rec_L(2i, 2j+1) + \text{rounding} \end{bmatrix} \gg 3 \quad \text{(Eq. 6)}$$

$$rec_L'^{(i,j)} = \begin{bmatrix} rec_L(2i, 2j-1) + rec_L(2i-1, 2j) + 12 \cdot rec_L(2i, 2j) + \\ rec_L(2i+1, 2j) + rec_L(2i, 2j+1) + \text{rounding} \end{bmatrix} \gg 4 \quad \text{(Eq. 7)}$$

In embodiments, the rounding value may be 0, or non-zero. For example, in Equation (6), the rounding value may be 4, and in Equation (7), the rounding value may be 8.

In embodiments, when the samples are not available from the row above, the current row pixel (for example, the luma sample 1124 located at index 4) may be used for padding the above sample (for example the luma sample 1124 located at index 0). In embodiments, when the current sample is located at a superblock/CTU boundary, the current row pixel may be used for padding the sample located at sample position with index 0.

Example 3

Figure 11C:
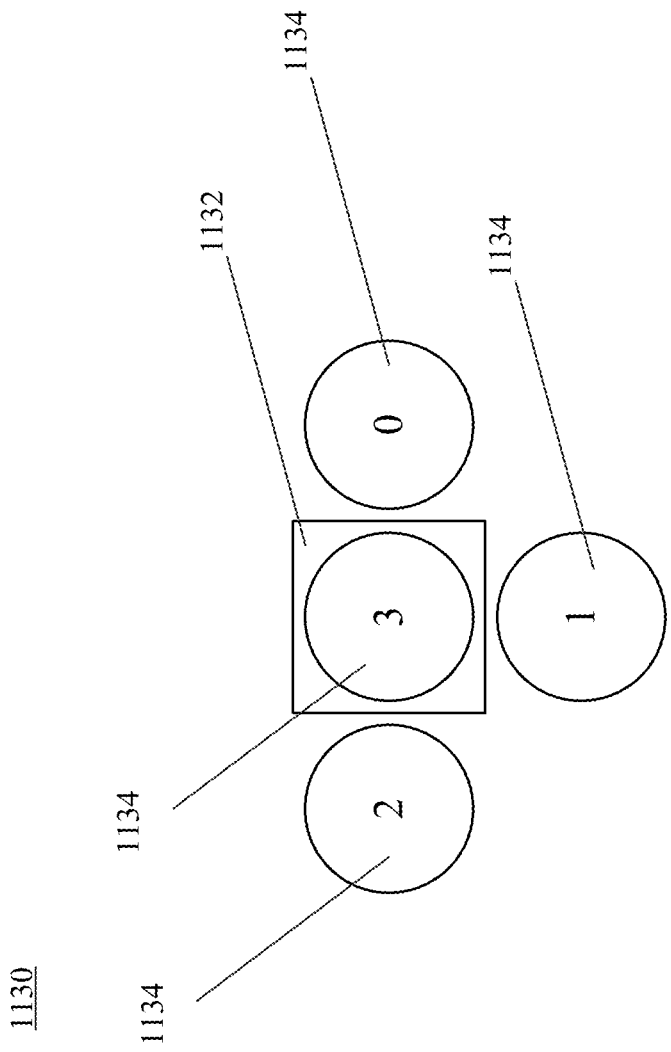

According to Example 3, a 4-tap filter may be supported for a cross-component downsampling process, for example a CfL luma downsampling process. FIG. 11C shows a chroma downsampling format 1130 corresponding to the 4-tap filter, according to embodiments. As can be seen in FIG. 11C, the chroma downsampling format 1130 includes a chroma sample 1132, and four corresponding luma samples 1134, which are indexed from 0 to 3. In embodiments, the luma sample 1124 corresponding with index 3 may be collocated with the chroma sample 1132. In embodiments, the luma samples 1134 may be reconstructed luma samples, which may be used to derive a downsampled luma pixel corresponding to the chroma sample 1132, which may be located at location (i,j), based on one of Equation (8) and Equation (9) below.

$$rec_L'^{(i,j)} = \left[ \begin{array}{c} rec_L(2i-1, 2j) + 5 \cdot rec_L(2i, 2j) + \\ rec_L(2i+1, 2j) + rec_L(2i, 2j+1) + \text{rounding} \end{array} \right] \gg 3 \quad \text{(Eq. 8)}$$

$$rec_L'^{(i,j)} = \left[ \begin{array}{c} rec_L(2i-1, 2j) + 13 \cdot rec_L(2i, 2j) + \\ rec_L(2i+1, 2j) + rec_L(2i, 2j+1) + \text{rounding} \end{array} \right] \gg 4 \quad \text{(Eq. 9)}$$

In embodiments, the rounding value may be 0, or non-zero. For example, in Equation (8), the rounding value may be 4, and in Equation (9), the rounding value may be 8.

Example 4

Figure 11D:
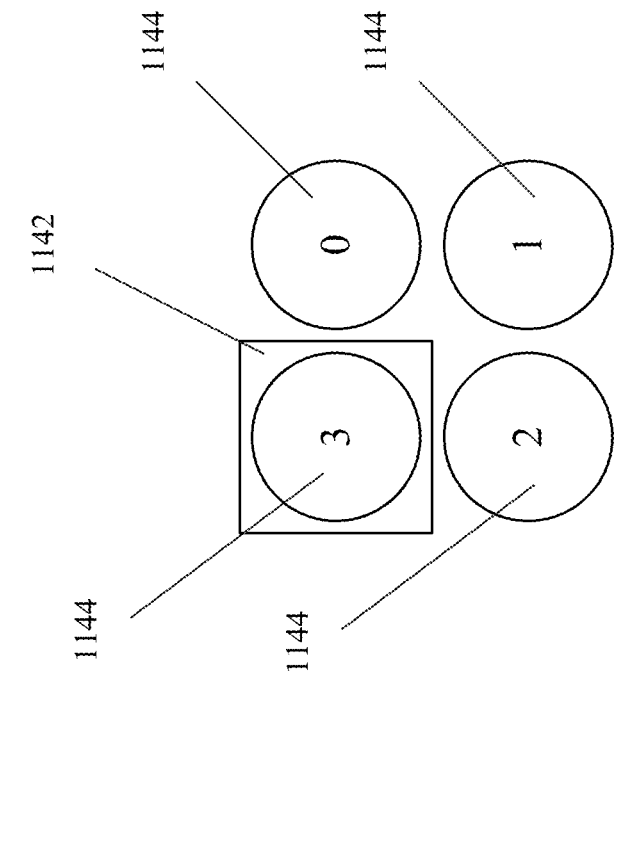

According to Example 4, another 4-tap filter may be supported for a cross-component downsampling process, for example a CfL luma downsampling process. FIG. 11D shows a chroma downsampling format 1140 corresponding to the 4-tap filter, according to embodiments. As can be seen in FIG. 11D, the chroma downsampling format 1140 includes a chroma sample 1142, and four corresponding luma samples 1144, which are indexed from 0 to 3. In embodiments, the luma sample 1144 corresponding with index 3 may be collocated with the chroma sample 1142. In embodiments, the luma samples 1144 may be reconstructed luma samples, which may be used to derive a downsampled luma pixel corresponding to the chroma sample 1142, which may be located at location (i,j), based on one of Equation (10) and Equation (11) below.

$$rec_L'^{(i,j)} = \left[ \begin{array}{c} rec_L(2i+1, 2j) + 5 \cdot rec_L(2i, 2j) + \\ rec_L(2i+1, 2j+1) + rec_L(2i, 2j+1) + \text{rounding} \end{array} \right] \gg 3 \quad \text{(Eq. 10)}$$

$$rec_L'^{(i,j)} = \left[ \begin{array}{c} rec_L(2i+1, 2j) + 13 \cdot rec_L(2i, 2j) + \\ rec_L(2i+1, 2j+1) + rec_L(2i, 2j+1) + \text{rounding} \end{array} \right] \gg 4 \quad \text{(Eq. 11)}$$

In embodiments, the rounding value may be 0, or non-zero. For example, in Equation (10), the rounding value may be 4, and in Equation (11), the rounding value may be 8.

Example 5

Figure 11E:
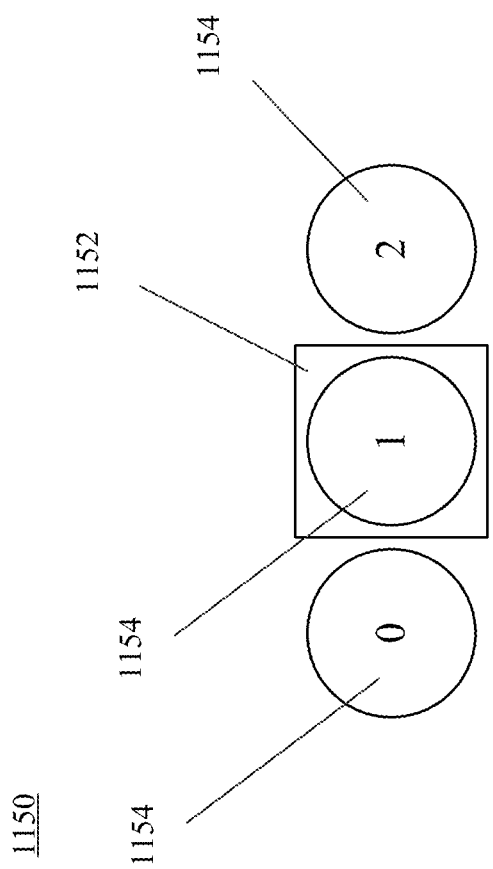

According to Example 5, a 3-tap filter may be supported for a cross-component downsampling process, for example a CfL luma downsampling process. FIG. 11E shows a chroma downsampling format 1150 corresponding to the 3-tap filter, according to embodiments. As can be seen in FIG. 11E, the chroma downsampling format 1150 includes a chroma sample 1152, and three corresponding luma samples 1154, which are indexed from 0 to 2. In embodiments, the luma sample 1154 corresponding with index 1 may be collocated with the chroma sample 1152. In embodiments, the luma samples 1154 may be reconstructed luma samples, which may be used to derive a downsampled luma pixel corresponding to the chroma sample 1152, which may be located at location (i,j), based on one of Equation (12) and Equation (13) below.

$$rec_L'^{(i,j)} = \left[ \begin{array}{c} rec_L(2i-1, 2j) + 6 \cdot rec_L(2i, 2j) + \\ rec_L(2i+1, 2j) + \text{rounding} \end{array} \right] \gg 3 \quad \text{(Eq. 12)}$$

$$rec_L'^{(i,j)} = \left[ \begin{array}{c} rec_L(2i-1, 2j) + 14 \cdot rec_L(2i, 2j) + \\ rec_L(2i+1, 2j) + \text{rounding} \end{array} \right] \gg 4 \quad \text{(Eq. 13)}$$

In embodiments, the rounding value may be 0, or non-zero. For example, in Equation (12), the rounding value may be 4, and in Equation (13), the rounding value may be 8.

In embodiments, the filters discussed in Examples 1 through 5, in addition to the filter corresponding to Equation (4) and the downsampling format 1000 of AV1, may be supported when down-sample process for luma reconstructed samples is needed.

In one embodiment, N filters may be used, where N can be 1, 2, 3, 4, 5 or 6. In embodiments, when N is 4, the filters corresponding to Examples 1 through 3 and the AV1 filter corresponding to Equation (4) may be used. In embodiments, when N is 3, the filters corresponding to Examples 1 and 2, and the AV1 filter corresponding to Equation (4) may be used. In embodiments, when N is 3, the filters corresponding to Examples 1 and 3, and the AV1 filter corresponding to Equation (4) may be used.

In embodiments, a high-level syntax flag/index can be signaled to indicate which downsampling filter is used in the cross-component intra prediction mode, such as CfL prediction mode or other downsampling processes, involved in encoding/decoding process that requires downsampling luma to a lower resolution and align with chroma, such as other cross-component prediction methods. In embodiments, the high-level flag/index can be signaled in at least one of a sequence header or sequence parameter set (SPS), a picture parameter set (PPS), an adaptive parameter set (APS), a video parameter set (VPS), a slice header (SH), a picture header (PH), a frame header, a tile header, a coding tree unit (CTU) header, a Superblock header, and a block having a certain pre-defined block size (e.g., 32×32, 64×64).

Figure 12:
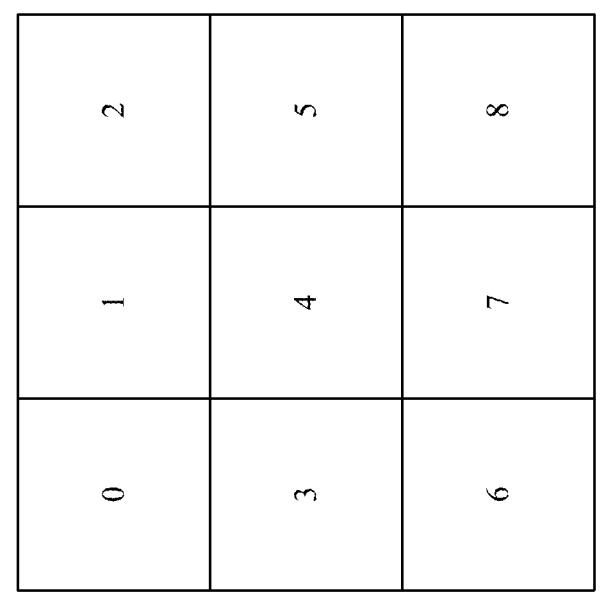

In embodiments, the downsampling filter can be signaled for each pixel, and the tap coefficient for the nine positions around the collocated luma pixel maybe signaled. In one embodiment, when signaling the filter coefficient, the filter coefficient corresponding to the collocated position may be associated with greater magnitude. FIG. 12 shows an example of the nine positions, indexed from 0 to 8. In embodiments, the center position (index 4) may be collocated with a chroma sample.

In embodiments, the filter coefficients may be signaled in at least one of a sequence header, an SPS, a PPS, an APS, a VPS, a SH, a PH, a frame header, a tile header, a CTU/Superblock header, and a block having a certain pre-defined block size (e.g., 32×32, 64×64).

FIG. 13 is a flowchart of a process 1300 for performing cross-component intra prediction, according to embodiments.

As shown in FIG. 13, at operation 1302, the process 1300 includes receiving a current chroma block from a coded bitstream.

As further shown in FIG. 13, at operation 1304, the process 1300 includes obtaining, from the coded bitstream, a syntax element indicating a downsampling filter used for a chroma from luma (CfL) intra prediction mode. In embodiments, the downsampling filter may be any filter from among the filters discussed above with respect to Examples 1 through 5 and the filter corresponding to Equation 4 and FIG. 10. In embodiments, the syntax element may be the high-level flag or index discussed above. In embodiments, the syntax element may be signaled in at least one from among a sequence header, a sequence parameter set, a picture parameter set, an adaptive parameter set, a video parameter set, a slice header, a picture header, a frame header, a tile header, a coding tree unit header, a superblock header, or a block having a predetermined block size.

As further shown in FIG. 13, at operation 1306, the process 1300 includes selecting the downsampling filter among a plurality of downsampling filters to be used for a chroma block in the CfL intra prediction mode.

As further shown in FIG. 13, at operation 1308, the process 1300 includes determining luma sample positions associated with the current chroma block based on the selected downsampling filter.

As further shown in FIG. 13, at operation 1310, the process 1300 includes downsampling a plurality of luma samples at the luma sample positions, wherein pixels in each downsampled luma sample are co-located with corresponding pixels in the current chroma block. In embodiments, operation 1310 may be performed using any one or more of Equations (4) through (13) discussed above.

As further shown in FIG. 13, at operation 1312, the process 1300 includes reconstructing the current chroma block based on at least the plurality of downsampled luma samples.

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques of embodiments of the present disclosure described above, can be implemented as computer software using computer-readable instructions and physically stored in one or more computer-readable media. For example, FIG. 14 shows a computer system (900) suitable for implementing embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 14 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), and camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices). For example, such devices may be audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900); others are commonly integrated into the core of the computer system 900 by attachment to a system bus as described below (for example Ethernet interface into a PC computer system or cellular network interface into a smartphone computer system). Using any of these networks, computer system (900)

can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (955). Certain protocols and protocol stacks can be used on each of those networks and network interfaces as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like. A graphics adapter (950) may be included in the core (940).

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, an architecture corresponding to computer system (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:
1. A method for video encoding, the method being performed by at least one processor and comprising:
  determining a current chroma block to be coded;
  determining that a cross-component intra prediction mode is selected for video coding;

based on determining that the cross-component mode is selected and based on multi-tap downsampling filter being supported, determining pixel values of a plurality of downsampled luma samples for a plurality of chroma samples using a first equation that is associated with the multi-tap downsampling filter being supported in combination with one or more AOMedia Video 1 ("AV1") filters, wherein the first equation is based on the multi-tap filter being used, pixel values at specific positions, and a rounding value; and encoding the current chroma block based on at least the plurality of downsampled luma samples.

2. The method of claim 1, wherein the multi-tap downsampling filter is one of: (1) a 6-tap filter, (2) a 5-tap filter, (3) a 4-tap filter in which the plurality of luma samples comprise a block co-located with the current chroma block or to one of a left direction, a down direction, and right direction of the current chroma block, (4) a 4-tap filter in which the plurality of luma samples comprise the block co-located with the current chroma block or to one of the right direction, the down direction, or a diagonal direction of the current chroma block; and (5) a 3-tap filter.

3. The method of claim 1, wherein when the multi-tap downsampling filter comprises a 6-tap filter, then a pixel value of each downsampled luma sample is determined according to the first equation below:

$$rec_L'^{(i,j)} = \begin{bmatrix} rec_L(2i-1, 2j-1) + 2 \cdot rec_L(2i, 2j-1) + rec_L(2i+1, 2j-1) + \\ rec_L(2i-1, 2j) + 2 \cdot rec_L(2i, 2j) + rec_L(2i+1, 2j) + R \end{bmatrix} \gg 3$$

where the current chroma block is located at a position (i,j), rec'$_L$ indicates the pixel value of the each downsampled luma sample, rec$_L$(x,y) indicates a luma sample located at a luma sample position (x,y), and R indicates the rounding value.

4. The method of claim 1, wherein when the multi-tap downsampling filter comprises a 5-tap filter, then the first equation is one of:

$$rec_L'^{(i,j)} = \begin{bmatrix} rec_L(2i, 2j-1) + rec_L(2i-1, 2j) + 4 \cdot rec_L(2i, 2j) + \\ rec_L(2i+1, 2j) + rec_L(2i, 2j+1) + R \end{bmatrix} \gg 3$$

or $$rec_L'^{(i,j)} = \begin{bmatrix} rec_L(2i, 2j-1) + rec_L(2i-1, 2j) + 12 \cdot rec_L(2i, 2j) + \\ rec_L(2i+1, 2j) + rec_L(2i, 2j+1) + R \end{bmatrix} \gg 4$$

where the current chroma block is located at a position (i,j), rec'$_L$ indicates the pixel value of the each downsampled luma sample, rec$_L$(x,y) indicates a luma sample located at a luma sample position (x,y), and R indicates the rounding value.

5. The method of claim 1, wherein when the downsampling filter comprises a 4-tap filter, then one luma sample is co-located with the current chroma block.

6. The method of claim 5, wherein when the downsampling filter comprises a 4-tap filter, the first equation is one of:

$$rec_L'(i, j) = \begin{bmatrix} rec_L(2i-1, 2j) + 5 \cdot rec_L(2i, 2j) + \\ rec_L(2i+1, 2j) + rec_L(2i, 2j+1) + R \end{bmatrix} \gg 3$$

or $$rec_L'(i, j) = \begin{bmatrix} rec_L(2i-1, 2j) + 13 \cdot rec_L(2i, 2j) + \\ rec_L(2i+1, 2j) + rec_L(2i, 2j+1) + R \end{bmatrix} \gg 4$$

where the current chroma block is located at a position (i,j), rec'$_L$ indicates the pixel value of the each downsampled luma sample, rec$_L$(x,y) indicates a luma sample located at a luma sample position (x,y), and R indicates the rounding value.

7. The method of claim 5, wherein when the downsampling filter comprises a 4-tap filter, the first equation is one of:

$$rec_L'(i, j) = \begin{bmatrix} rec_L(2i+1, 2j) + 5 \cdot rec_L(2i, 2j) + \\ rec_L(2i+1, 2j+1) + rec_L(2i, 2j+1) + R \end{bmatrix} \gg 3$$

or $$rec_L'(i, j) = \begin{bmatrix} rec_L(2i+1, 2j) + 13 \cdot rec_L(2i, 2j) + \\ rec_L(2i+1, 2j+1) + rec_L(2i, 2j+1) + R \end{bmatrix} \gg 4$$

where the current chroma block is located at a position (i,j), rec'$_L$ indicates the pixel value of the each downsampled luma sample, rec$_L$(x,y) indicates a luma sample located at a luma sample position (x,y), and R indicates the rounding value.

8. The method of claim 1, when the downsampling filter comprises a 3-tap filter, then first equation is one of:

$$rec_L'^{(i,j)} = \begin{bmatrix} rec_L(2i-1, 2j) + 6 \cdot rec_L(2i, 2j) + \\ rec_L(2i+1, 2j) + R \end{bmatrix} \gg 3$$

or $$rec_L'(i, j) = \begin{bmatrix} rec_L(2i-1, 2j) + 14 \cdot rec_L(2i, 2j) + \\ rec_L(2i+1, 2j) + R \end{bmatrix} \gg 4$$

where the current chroma block is located at a position (i,j), rec'$_L$ indicates the pixel value of the each downsampled luma sample, rec$_L$(x,y) indicates a luma sample located at a luma sample position (x,y), and R indicates the rounding value.

9. The method of claim 1, wherein a syntax element is signaled in at least one from among a sequence header, a sequence parameter set, a picture parameter set, an adaptive parameter set, a video parameter set, a slice header, a picture header, a frame header, a tile header, a coding tree unit header, a superblock header, or a block having a predetermined block size, the syntax element comprising an indication of the multi-tap downsampling filter used in the cross-component intra prediction mode.

10. A device for performing cross-component intra prediction, the device comprising:

at least one memory configured to store program code; and at least one processor configured to access the program code and operate as instructed by the program code, the program code including:

obtaining code configured to cause the at least one processor to obtain a current chroma block from a coded bitstream;

determining code configured to cause the at least one processor to determine, from the coded bitstream, that a cross-component intra prediction mode is selected for video decoding;

selecting code configured to cause the at least one processor to determine, based on determining that the cross-component mode is selected and based on multi-tap downsampling filter being supported, pixel values of a plurality of downsampled luma samples for a plurality of chroma samples using a first equation that is associated with the multi-tap downsampling filter being supported in combination with one or more AOMedia Video 1 ('AV1") filters, wherein the first equation is based on the multi-tap filter being used, pixel values at specific positions, and a rounding value; and reconstructing code configured to cause the at least one processor to reconstruct the current chroma block based on at least the plurality of downsampled luma samples.

11. The device of claim 10, wherein when the multi-tap downsampling filter is one of: (1) a 6-tap filter, (2) a 5-tap filter, (3) a 4-tap filter in which the plurality of luma samples comprise a block co-located with the current chroma block or to one of a left direction, a down direction, and right direction of the current chroma block, (4) a 4-tap filter in which the plurality of luma samples comprise the block co-located with the current chroma block or to one of the right direction, the down direction, or a diagonal direction of the current chroma block; and (5) a 3-tap filter.

12. The device of claim 10, wherein when the downsampling filter comprises a 6-tap filter, then a pixel value of each downsampled luma sample is determined according to the first equation below:

$$rec'_L(i, j) = \begin{bmatrix} rec_L(2i-1, 2j-1) + 2 \cdot rec_L(2i, 2j-1) + rec_L(2i+1, 2j-1) + \\ rec_L(2i-1, 2j) + 2 \cdot rec_L(2i, 2j) + rec_L(2i+1, 2j) + R \end{bmatrix} \gg 3$$

where the current chroma block is located at a position (i,j), $rec'_L$ indicates the pixel value of the each downsampled luma sample, $rec_L(x,y)$ indicates a luma sample located at a luma sample position (x,y), and R indicates the rounding value.

13. The device of claim 10, wherein when the downsampling filter comprises a 5-tap filter, then the first equation is one of:

$$rec'_L(i, j) = \begin{bmatrix} rec_L(2i, 2j-1) + rec_L(2i-1, 2j) + 4 \cdot rec_L(2i, 2j) + \\ rec_L(2i+1, 2j) + rec_L(2i, 2j+1) + R \end{bmatrix} \gg 3$$

or $$rec'_L(i, j) = \begin{bmatrix} rec_L(2i, 2j-1) + rec_L(2i-1, 2j) + 12 \cdot rec_L(2i, 2j) + \\ rec_L(2i+1, 2j) + rec_L(2i, 2j+1) + R \end{bmatrix} \gg 4$$

where the current chroma block is located at a position (i,j), $rec'_L$ indicates the pixel value of the each downsampled luma sample, $rec_L(x,y)$ indicates a luma sample located at a luma sample position (x,y), and R indicates the rounding value.

14. The device of claim 10, wherein when the downsampling filter comprises a 4-tap filter, then one luma sample is co-located with the current chroma block.

15. The device of claim 14, wherein the first equation is one of:

$$rec_L'^{(i,j)} = \begin{bmatrix} rec_L(2i-1, 2j) + 5 \cdot rec_L(2i, 2j) + \\ rec_L(2i+1, 2j) + rec_L(2i, 2j+1) + R \end{bmatrix} \gg 3$$

or $$rec_L'^{(i,j)} = \begin{bmatrix} rec_L(2i-1, 2j) + 13 \cdot rec_L(2i, 2j) + \\ rec_L(2i+1, 2j) + rec_L(2i, 2j+1) + R \end{bmatrix} \gg 4$$

where the current chroma block is located at a position (i,j), $rec'_L$ indicates the pixel value of the each downsampled luma sample, $rec_L(x,y)$ indicates a luma sample located at a luma sample position (x,y), and R indicates the rounding value.

16. The device of claim 14, wherein the first equation is one of:

$$rec_L'^{(i,j)} = \begin{bmatrix} rec_L(2i+1, 2j) + 5 \cdot rec_L(2i, 2j) + \\ rec_L(2i+1, 2j+1) + rec_L(2i, 2j+1) + R \end{bmatrix} \gg 3$$

or $$rec_L'^{(i,j)} = \begin{bmatrix} rec_L(2i+1, 2j) + 13 \cdot rec_L(2i, 2j) + \\ rec_L(2i+1, 2j+1) + rec_L(2i, 2j+1) + R \end{bmatrix} \gg 4$$

where the current chroma block is located at a position (i,j), $rec'_L$ indicates the pixel value of the each downsampled luma sample, $rec_L(x,y)$ indicates a luma sample located at a luma sample position (x,y), and R indicates the rounding value.

17. The device of claim 10, wherein when the downsampling filter comprises a 3-tap filter, then the first equation is one of:

$$rec_L'^{(i,j)} = \begin{bmatrix} rec_L(2i-1, 2j) + 6 \cdot rec_L(2i, 2j) + \\ rec_L(2i+1, 2j) + R \end{bmatrix} \gg 3$$

or $$rec_L'^{(i,j)} = \begin{bmatrix} rec_L(2i-1, 2j) + 14 \cdot rec_L(2i, 2j) + \\ rec_L(2i+1, 2j) + R \end{bmatrix} \gg 4$$

where the current chroma block is located at a position (i,j), $rec'_L$ indicates the pixel value of the each downsampled luma sample, $rec_L(x,y)$ indicates a luma sample located at a luma sample position (x,y), and R indicates the rounding value.

18. A non-transitory computer-readable medium storing instructions, the instructions comprising: one or more instructions that, when executed by one or more processors of a device for performing cross-component intra prediction, cause the one or more processors to:

perform a conversion between a visual media file and a bitstream of a visual media data according to a format rule, wherein the bitstream comprises a first syntax element indicating that a cross-component intra prediction mode is selected for video coding; and wherein the format rule comprises determining pixel values of a plurality of downsampled luma samples for a plurality of chroma samples using a first equation that is associated with the multi-tap downsampling filter being supported based on determining that the cross-component mode is selected and based on multi-tap downsampling filter being supported in combination with one or more AOMedia Video 1 ("AV1") filters, wherein the first equation is based on the multi-tap filter being used, pixel values at specific positions, and a rounding value.

19. The non-transitory computer-readable medium of claim 18, wherein the multi-tap downsampling filter is one of: (1) a 6-tap filter, (2) a 5-tap filter, (3) a 4-tap filter in which the plurality of luma samples comprise a block co-located with the current chroma block or to one of a left direction, a down direction, and right direction of the current chroma block, (4) a 4-tap filter in which the plurality of luma samples comprise the block co-located with the current chroma block or to one of the right direction, the down direction, or a diagonal direction of the current chroma block; and (5) a 3-tap filter.

20. The non-transitory computer-readable medium of claim 18, wherein the bitstream comprises the first syntax element in at least one from among a sequence header, a sequence parameter set, a picture parameter set, an adaptive parameter set, a video parameter set, a slice header, a picture header, a frame header, a tile header, a coding tree unit header, a superblock header, or a block having a predetermined block size, and wherein the bitstream further comprises a second syntax element that indicates the multi-tap downsampling filter used in the cross-component intra prediction mode.

* * * * *